US011973746B2

(12) United States Patent
Starsinic

(10) Patent No.: US 11,973,746 B2
(45) Date of Patent: Apr. 30, 2024

(54) CONNECTING IMSI-LESS DEVICES TO THE EPC

(71) Applicant: InterDigital Patent Holdings, Inc., Wilmington, DE (US)

(72) Inventor: Michael F. Starsinic, Newtown, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 17/017,933

(22) Filed: Sep. 11, 2020

(65) Prior Publication Data

US 2020/0412706 A1 Dec. 31, 2020

Related U.S. Application Data

(63) Continuation of application No. 15/892,454, filed on Feb. 9, 2018, now Pat. No. 10,812,461, which is a (Continued)

(51) Int. Cl.
*H04L 9/40* (2022.01)
*H04W 4/70* (2018.01)
(Continued)

(52) U.S. Cl.
CPC ............ *H04L 63/08* (2013.01); *H04L 63/105* (2013.01); *H04W 4/70* (2018.02); *H04W 8/20* (2013.01);
(Continued)

(58) Field of Classification Search
CPC ... H04L 63/08; H04L 61/6054; H04L 63/105; H04L 63/10; H04W 4/70; H04W 8/20;
(Continued)

(56) References Cited

U.S. PATENT DOCUMENTS 8,538,410 B2  9/2013 Karim et al.
9,503,881 B2  11/2016 Liu et al.
(Continued)

FOREIGN PATENT DOCUMENTS

CN      1689369 A   10/2005
CN    101079786 A   11/2007
(Continued)

OTHER PUBLICATIONS

3GPP TS 33234 V7.5.0 (Jun. 2007): 3rd Generation Partnership Project; Technical Specification Group Service and System Aspects; 3G Security; Wireless Local Area Network (WLAN) interworking security (Release 7).
(Continued)

*Primary Examiner* — Thai Nguyen
(74) *Attorney, Agent, or Firm* — Flaster Greenberg P.C.

(57) ABSTRACT

Capillary network devices (i.e., IMSI-less devices) may connect to an EPC through a home WLAN. A WLAN can be configured by the homeowner to accept responsibility for the traffic or a WLAN can indicate to a network that it will allow the traffic if the traffic is sponsored by an application server or if it is compensated for the traffic by the network operator. Where an IMSI-less device has a business relationship with a network operator, a WLAN can allow the device to authenticate with the network and obtain a device identifier from the network. Where an IMSI-less device has a business relationship with a SCS that has a business relationship with the network operator, the WLAN can allow the device to authenticate with the network.

13 Claims, 11 Drawing Sheets

Related U.S. Application Data continuation of application No. 14/901,888, filed as application No. PCT/US2014/045733 on Jul. 8, 2014, now Pat. No. 9,930,613.

(60) Provisional application No. 61/843,520, filed on Jul. 8, 2013.

(51) Int. Cl.
*H04W 8/20* (2009.01)
*H04W 12/088* (2021.01)
*H04W 48/16* (2009.01)
*H04L 101/654* (2022.01)
*H04W 84/12* (2009.01)

(52) U.S. Cl.
CPC ......... *H04W 12/088* (2021.01); *H04W 48/16* (2013.01); *H04L 2101/654* (2022.05); *H04W 84/12* (2013.01)

(58) Field of Classification Search
CPC ... H04W 12/088; H04W 48/16; H04W 84/12; H04W 12/06; H04W 12/08; H04W 12/30
See application file for complete search history.

(56) References Cited

U.S. PATENT DOCUMENTS

| | | | |
|---|---|---|---|
| 2003/0119481 A1 | 6/2003 | Haverinen et al. | |
| 2009/0064291 A1* | 3/2009 | Wahl ................. | H04L 63/0815 726/5 |
| 2009/0313466 A1* | 12/2009 | Naslund ............. | H04L 63/061 713/155 |
| 2010/0142499 A1 | 6/2010 | Zhang et al. | |
| 2010/0216426 A1 | 8/2010 | Karim et al. | |
| 2010/0281523 A1* | 11/2010 | Pan .................... | H04L 63/0892 726/4 |
| 2011/0173335 A1 | 7/2011 | Soulie et al. | |
| 2013/0294321 A1* | 11/2013 | Wang ................. | H04W 28/16 370/312 |
| 2014/0086226 A1* | 3/2014 | Zhao .................. | H04W 76/11 370/338 |
| 2014/0146806 A1 | 5/2014 | Liu et al. | |
| 2014/0298428 A1 | 10/2014 | Qu et al. | |
| 2016/0119347 A1* | 4/2016 | Liu .................... | H04W 36/14 370/331 |
| 2018/0014192 A1 | 1/2018 | Pattar et al. | |

FOREIGN PATENT DOCUMENTS

| | | |
|---|---|---|
| CN | 101374334 A | 2/2009 |
| CN | 101606372 A | 12/2009 |
| CN | 102299924 A | 12/2011 |
| CN | 103167461 A | 6/2013 |
| EP | 1988730 A1 | 11/2008 |
| JP | 2010-507307 A | 3/2010 |
| JP | 2010-518719 A | 5/2010 |
| WO | 2003/037023 A1 | 5/2003 |
| WO | 2006/005999 A1 | 1/2006 |
| WO | 2006/126763 A1 | 11/2006 |
| WO | 2007/097101 A1 | 8/2007 |
| WO | 2008/095918 A1 | 8/2008 |
| WO | 2012/001514 A2 | 1/2012 |
| WO | 2013/017098 A1 | 2/2013 |
| WO | 2013/079037 A1 | 6/2013 |
| WO | 2013/098156 A1 | 7/2013 |
| WO | 2014/029443 A1 | 2/2014 |

OTHER PUBLICATIONS

3rd Generation Partnership Project; (3GPP) TR 21.905 V12.0.0, 3rd Generation Partnership Project; Technical Specification Group Services and System Aspects; Vocabulary for 3GPP Specifications, (Release 12), Jun. 2013, 64 pages.
3rd Generation Partnership Project; (3GPP) TS 23.003 V11.5.0, 3rd Generation Partnership Project; Technical Specification Group Core Network and Terminals; Numbering, addressing and identification (Release 11), Mar. 2013, 83 pages.
3rd Generation Partnership Project; (3GPP) TS 23.203 V12.1.0, 3rd Generation Partnership Project; Technical Specification Group Services and System Aspects; Policy and Charging Control Architecture (Release 12), Jun. 2013, 189 pages.
3rd Generation Partnership Project; (3GPP) TS 23.234 V 11 .0.0, Technical Specification Group Services and System Aspects; System Aspects; 3GPP system to Wireless Local Area Network (WLAN) interworking; System Description (Release 11), Sep. 17, 2012, 1-84.
3rd Generation Partnership Project; (3GPP) TS 23.401 V12.1.0, 3rd Generation Partnership Project; Technical Specification Group Services and System Aspects; General Packet Radio Service (GPRS) enhancements for Evolved Universal Terrestrial Radio Access Network (E-UTRAN) access (Release 12), Jun. 2013, 291 pages.
3rd Generation Partnership Project; (3GPP); TS 23.402 V12.1.0, 3rd Generation Partnership Project; Technical Specification Group Services and System Aspects; Architecture enhancements for non-3GPP accesses (Release 12), Jun. 2013, 254 pages.
3rd Generation Partnership Project; (3GPP); TS 24.008 V12.2.0, 3rd Generation Partnership Project; Technical Specification Group Core Network and Terminals; Mobile radio interface Layer 3 specification; Core network protocols; Stage 3 (Release 12), Jun. 2013, 682 pages.
3rd Generation Partnership Project; (3GPP); TS 24.301 V12.1.0, 3rd Generation Partnership Project; Technical Specification Group Core Network and Terminals; Non- Access-Stratum (NAS) protocol for Evolved Packet System (EPS); Stage 3 (Release 12), Jun. 2013, 350 pages.
3rd Generation Partnership Project; (3GPP); TS 29.210 V6.7.0, 3rd Generation Partnership Project; Technical Specification Group Core Network and Terminals; Charging rule provisioning over Gx interface (Release 6), Dec. 2006, 21 pages.
3rd Generation Partnership Project; (3GPP); TS 29.212 V12.1.0, 3rd Generation Partnership Project; Technical Specification Group Core Network and Terminals; Policy and Charging Control (PCC); Reference points (Release 12), Jun. 2013, 200 pages.
3rd Generation Partnership Project; (3GPP); TS 29.273 V12.0.0. 3rd Generation Partnership Project; Technical Specification Group Core Network and Terminals; Evolved Packet System (EPS); 3GPP EPS AAA interfaces (Release 12), Jun. 2013, 136 pages.
3rd Generation Partnership Project; (3GPP); TS 33.402 V12.0.0, 3rd Generation Partnership Project; Technical Specification Group Services and System Aspects; 3GPP System Architecture Evolution (SAE); Security aspects of non-3GPP accesses (Release 12), Jun. 2013, 55 pages.
Intel, Cisco, "Solution for Trusted WLAN access to EPC", 3GPP TSG SA WG2 Meeting #86, TD S2-1131481, Jul. 11-15, 2011, 7 pages.
International Application No. PCT/US2014/045733: International Search Report and the Written Opinion dated Oct. 29, 2014, 84 pages.
Japanese Patent Application No. 2016-525423: Notice of Allowance dated Feb. 13, 2017, 3 pages.
Korean Patent Application No. 10-2016-7003100: Office Action dated Dec. 17, 2016, 6 pages (No Translation available).

* cited by examiner

CONNECTING IMSI-LESS DEVICES TO THE EPC

CROSS REFERENCE TO RELATED APPLICATIONS

This application is a continuation of U.S. application Ser. No. 15/892,454 filed Feb. 9, 2018 which is a continuation of U.S. application Ser. No. 14/901,888 filed Dec. 29, 2015 now U.S. Pat. No. 9,930,613 issued Sep. 27, 2018 which is a National Stage Application filed under 35 U.S.C. 371 of International Application No. PCT/US2014/045733, filed Jul. 8, 2014, which claims benefit under 35 U.S.C. § 119(e) of Provisional U.S. Patent Application No. 61/843,520, filed Jul. 8, 2013, the contents of which are hereby incorporated by reference in its entirety.

BACKGROUND

Companies that offer communication services often provide both mobile network services and fixed broadband services. For example, it is common for companies that provide cellular phone service to also offer home broadband services.

Typically, mobile telephone service is supported by an evolved packet core (EPC) network. Broadband service is supported by a separate broadband network. Accordingly, a network operator may have two separate networks with which to route data—the EPC network and the broadband network.

Network operators have sought flexibility in routing data across their networks. For example, network operators may be interested in being able to selectively route data across either the EPC or the broadband network. More particularly, network operators may wish to be able to route requests that are received at a wireless access point associated with a broadband service through the EPC network rather than through the broadband network. Existing systems do not support such functionality in many scenarios.

SUMMARY

Applicant discloses herein systems and methods for providing devices that lack subscriber identifier information with access to an EPC network. In connection with providing devices with access to the EPC network, the systems and methods collect data specifying an entity that should be charged for the access.

In a typical scenario, requests to access application servers such as a Web page server are received at a WLAN access node. For example, a home network wireless router may receive requests from devices such as, for example, mobile phones, tablet computers, laptops, etc., to access Web content. The WLAN access node, e.g., a wireless router, may be communicatively coupled to a broadband network, but may also have a communication path to an EPC network. In some instances, the operator of the broadband network and the EPC network may wish to route requests and responsive data over the EPC instead of the broadband network. However, the various devices that access a WLAN access node may not have an international mobile subscriber identity (IMSI) as is typically required for authentication with the EPC network. In other words, a tablet computer or personal digital assistant may not have been provisioned with an IMSI that would allow for a connection to the EPC. According to the aspect of the disclosed systems, the WLAN access node is programmed to recognize that a device is lacking a subscriber identity (IMSI) and to generate an authentication request providing a value for a subscriber identity and identifying limits for the access the particular device should be given through the EPC. For example, the WLAN may generate an authentication request that comprises information specifying any limits on the particular device communicating with a particular server or application via the EPC.

In an example embodiment of the disclosed systems, a wireless local area network (WLAN) system such as, for example, a WLAN access node (AN) receives a request from a device. The device may be any device suitable for communicating over a network including, for example, a mobile phone, a personal digital assistant, tablet, or other computing device. The request may be any that requires access to a server that may be communicated with via the broadband network or EPC network. In an example scenario, the request may be to access a Web site server that may be accessible via either the EPC or broadband network.

In response to receiving the request, the WLAN system determines that the device does not have a subscriber identity required for communication over the network. For example, the WLAN may determine that the device does not have an international mobile subscriber identity (IMSI). Typically, when devices communicate over the EPC network, the IMSI is used during authentication of the device prior to communication over the network. Accordingly, a lack of an IMSI would typically preclude a device from receiving a connection through the EPC network.

In an example embodiment, the WLAN system communicates authentication information in connection with establishing communication over the network. The authentication information specifies limits for providing the device with access to the network. In view of the device not having a subscriber identity that is typically used in authenticating with the EPC network, the system may place limits on the device's access over the network. The types of limits placed on the access provided by the network vary depending upon any relationships between the device and the provider of the EPC network. In an example embodiment, the authentication information may comprise an identifier, such as a name, for an access point that the device is permitted to access. In addition, or alternatively, the authentication information may comprise an identifier, such as a name, for an application server the device is permitted to contact.

In an example scenario, the WLAN may determine a relationship exists between the device and an operator of the EPC network. For example, the device may be a mobile phone issued by the communications company that operates the EPC network. In such an instance, the authentication information that may be communicated by the WLAN may further comprise a plurality of the following: a device identifier, a subscription identifier, an identifier of a wireless local area network the device is permitted to connect through.

In an example scenario, the WLAN may determine no relationship exists between the device and the operation of the EPC network. For example, the device may be a mobile phone issued by a communications company other than the one that operates the EPC network. In such an instance, the authentication information that may be communicated by the WLAN may further comprise a plurality of the following: a device identifier, a subscription identifier, an identifier specifying the device is permitted to communicate only with sponsored services; and an identifier specifying a quality of service level the device should be provided.

In connection with establishing a connection with the EPC network, the WLAN may establish a gateway control session. The WLAN generates a request to create a gateway control session where the request comprises the subscription identifier that was comprised in the authentication information that was previously communicated by the WLAN. In an example embodiment, the request comprises a Credit Control Request command. The command may comprise a Subscription-ID AVP, a User-Equipment-Info AVP, and Sponsorship-Requirement AVP. In an example scenario, the Subscription-ID attribute value pair is set to the subscription identifier comprised in the authentication information that was previously communicated by the WLAN. In an alternative scenario, the Subscription-ID attribute value pair is set to a value that identifies a wireless local area network. The User-Equipment-Info AVP may be set to a value provided by the device during authentication. In an alternative embodiment, the User-Equipment-Info AVP may be set to a value that was provided by a 3GPP AAA server during authentication. The Sponsorship-Requirement AVP contains information that specifies whether or not the requested flow must be sponsored.

The information that is comprised in the authentication request and the command to create a gateway control session reflects device configurations that may be used for purposes of charging for data flows that occur over the particular connection that is being established. For example, the request for authentication and the subsequent gateway control command may specify that the operator of the WLAN, i.e., the homeowner, should be charged.

This Summary is provided to introduce a selection of concepts in a simplified form that are further described below in the Detailed Description of Illustrative Embodiments. This Summary is not intended to identify key features or essential features of the claimed subject matter, nor is it intended to be used to limit the scope of the claimed subject matter. Other features are described below.

BRIEF DESCRIPTION OF THE DRAWINGS

The foregoing summary and the following additional description of the illustrative embodiments may be better understood when read in conjunction with the appended drawings. It is understood that potential embodiments of the disclosed systems and methods are not limited to those depicted.

DETAILED DESCRIPTION OF ILLUSTRATIVE EMBODIMENTS

Applicant discloses herein systems and methods for providing devices that lack subscriber identity information with access to an EPC network. In a typical scenario, requests to access application servers such as a Web page server are received at a WLAN access node. The WLAN access node, which may be, for example, a wireless router, may be communicatively coupled to a broadband network, but may also have a path to an EPC network. The WLAN access node is programmed to recognize a device is lacking a subscriber identity (IMSI) and to generate an authentication request providing a value for a subscriber identity and identifying any limits on the access the particular device has through the EPC. For example, the WLAN may generate an authentication request that comprises information intended to limit the particular server or application that the device may access via the EPC. The information contained in the authentication request may also specify which entity may be charged for any flows that may occur over the requested connection.

Example Architecture

Figure 1:
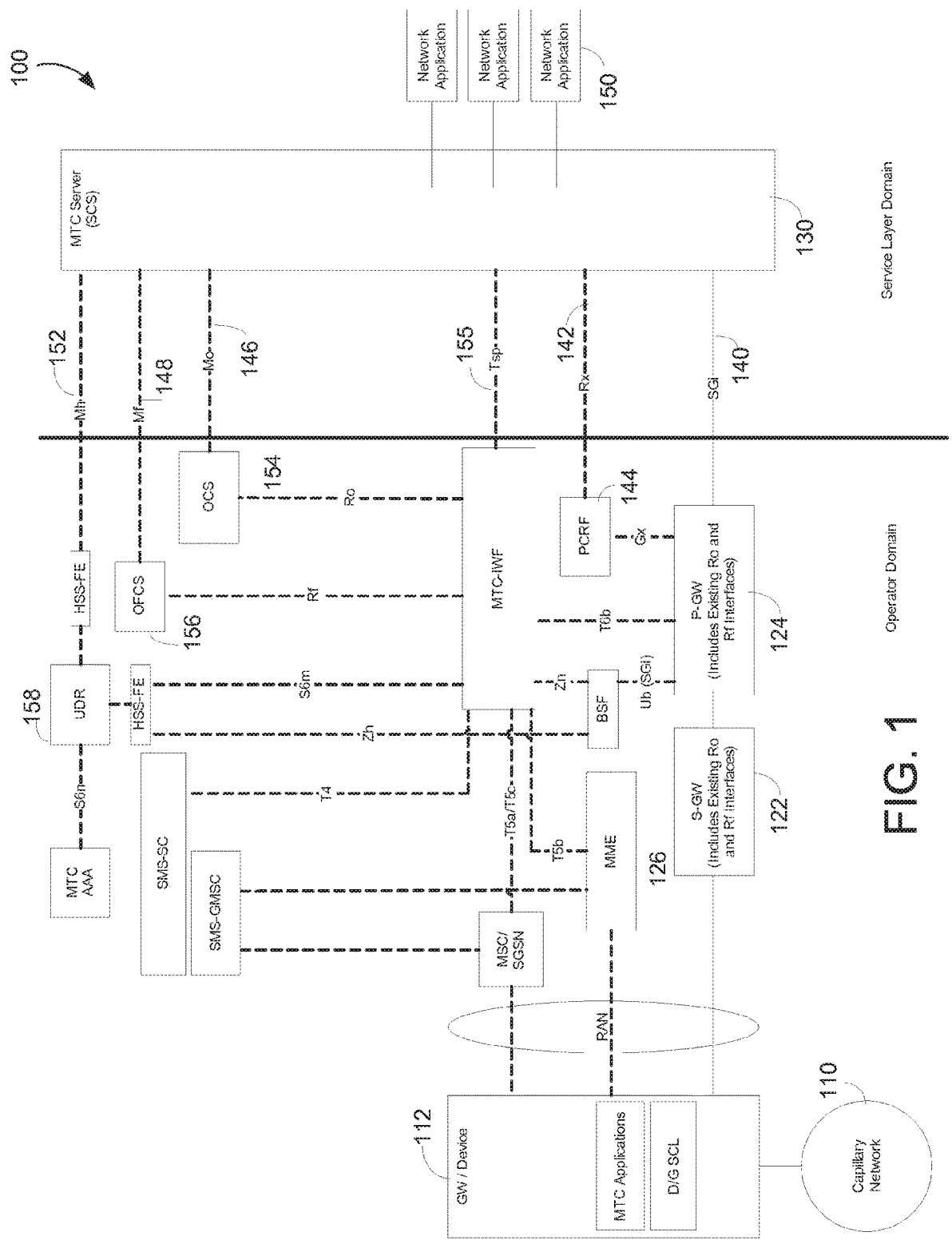
FIG. 1 illustrates an example communications network architecture.

FIG. 1 depicts an example network architecture that may be used for communication between user equipment (UE) and data services via an evolved packet core (EPC) network. Referring to FIG. 1, UE devices such as phones, tablets, laptops, etc., may be comprised in capillary network 110. Capillary network 110 provides local connectivity between devices and with gateway system 112. Gateway system 112 is programmed to provide access to networks such as, for example, an EPC network. Gateway system 112 may be any type of system that is suitable for performing the processing as described herein. In an example embodiment, the gateway system 112 may comprise a WLAN access node such as, for example, a WLAN router.

Gateway system 112 is communicatively coupled with components of an EPC network. For example, the gateway system 112 is communicatively coupled with EPC network components serving gateway 122, packet data network gateway 124, and mobility management entity server 126.

The EPC network components provide access to outside services via MTC services capability server 130. For example, the packet data network gateway 124 provides access to a packet data network via the SGi interface 140. Using the packet data network, access may be had to any of numerous services and applications 150. For example, access may be had to Web services applications via interface 140 and server 130.

The operator of services capability server (SCS) server 130 may have a business relationship with a Mobile Network Operator (MNO) that may be an owner/operator of the EPC network. The business relationship may allow the SCS and MNO to interface over several reference points that effectively integrate the SCS with the EPC. As noted above, the SGi interface 140 represents standard internet traffic. The Rx interface 142 allows the SCS to provide a Policy and Charging Rules Function (PCRF) server 144 with information about data flows. For example, the SCS 130 can indicate to the PCRF server 144 that a particular data flow requires a certain level of Quality of Service (QoS). The SCS 130 may also use the Rx interface 142 to indicate to the PCRF 144 that it wishes to sponsor a particular flow. Sponsoring a flow means that the traffic associated with the flow will not be charged to the end user device (e.g., user equipment (UE)), but instead the flow is to be charged to the SCS.

The Mo interface 146 allows the SCS 130 to interface to the MNO's Online Charging System (OCS) 154. The Mf interface 148 allows the SCS 130 to interface to the MNO's Offline Charging System (OFCS) 156. The Tsp interface 155 allows the SCS 130 to send triggers towards devices. The Mh interface 152 allows the SCS 130 to access the MNO's User Data Repository (UDR) 158. The UDR 158 may be a centralized entity that contains all subscriber information. It may serve as a replacement for a Home Subscriber Server (HSS), a Home Location Register (HLR), and/or a Subscription Profile Repository (SPR).

It will be appreciated that when requests from UE devices are received at gateway 112, gateway 112 is programmed, as described herein, to determine whether or not the UE comprises a subscriber identifier and, if not, format an authentication and authorization request for access over the EPC network.

Figure 2:
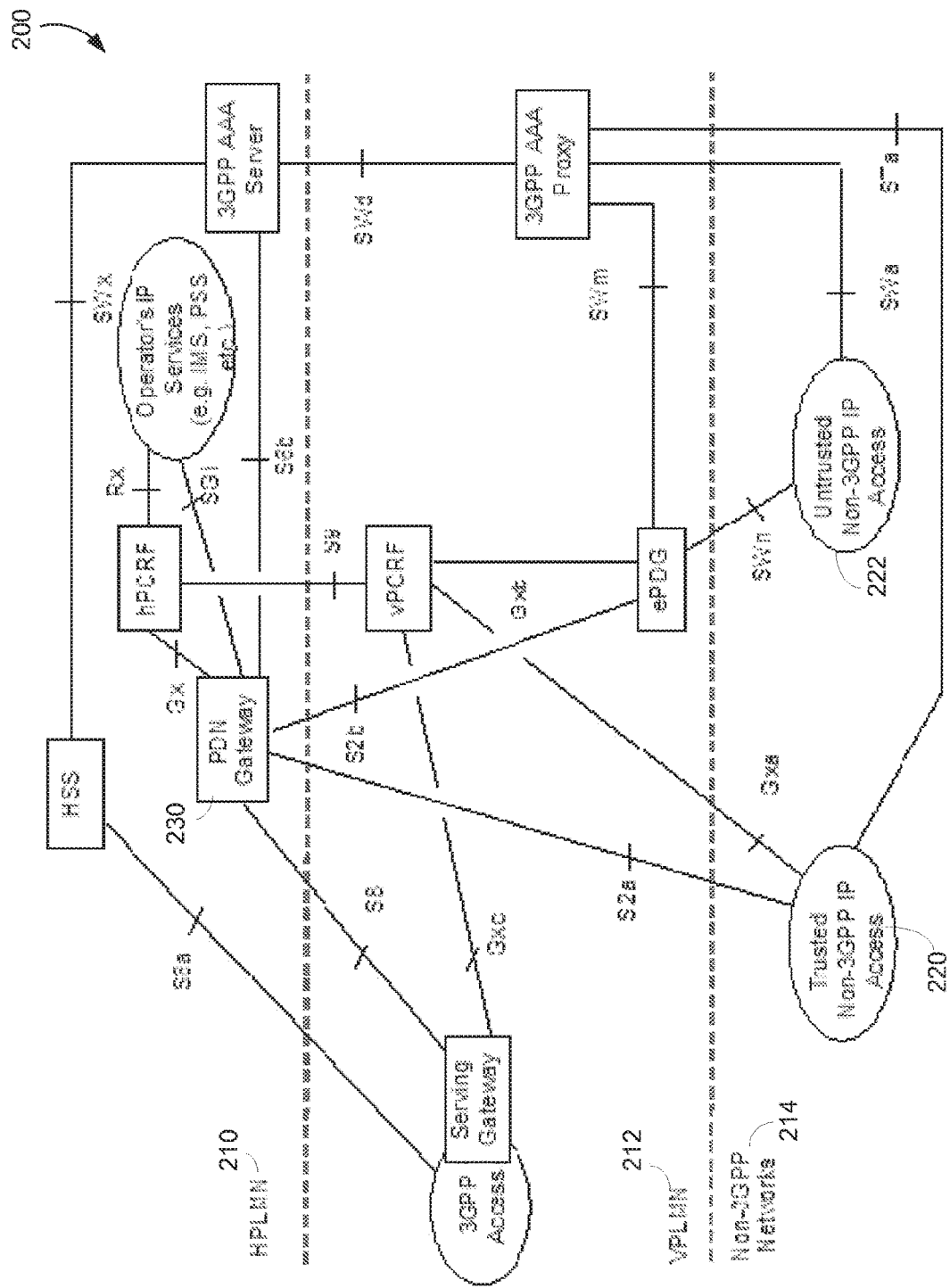
FIG. 2 illustrates an example communications network architecture.

FIG. 2 depicts an example EPC architecture 200 illustrating functional components serving various access networks including home public land mobile networks (HPLMN), visited public land mobile networks (VPLMN), and non-3GPP networks such as WLAN networks. As shown, non-3GPP network devices such as WLAN connected devices may be served by access gateways 220 and 222. More particularly, non-3GPP devices that are trusted may access packet data network 230 via access gateway 220. Non-3GPP devices that are untrusted may access packet data network 230 via access gateway 222. Previously existing systems required that any devices that accessed either gateway (trusted and untrusted) have subscriber identities, e.g., IMSI, provisioned thereon. IMSI-less devices (i.e., any device that does not have an IMSI thereon) were not able to access the Internet using a network that requires an IMSI. Indeed, using existing systems it may be difficult to determine an appropriate charging scheme when capillary network devices that have no relationship with an MNO or a 3GPP gateway (GW) connect to the EPC to access an application server (AS), such as an SCS, service capability layer, common service entity, or an M2M Server, via a 3GPP GW. It will be appreciated that the terms AS and SCS may be used interchangeably in many instances. It will likewise be appreciated that an ETSI M2M NSCL, a oneM2M CSE, and an M2M server are all types of ASs and SCSs.

Figure 3:
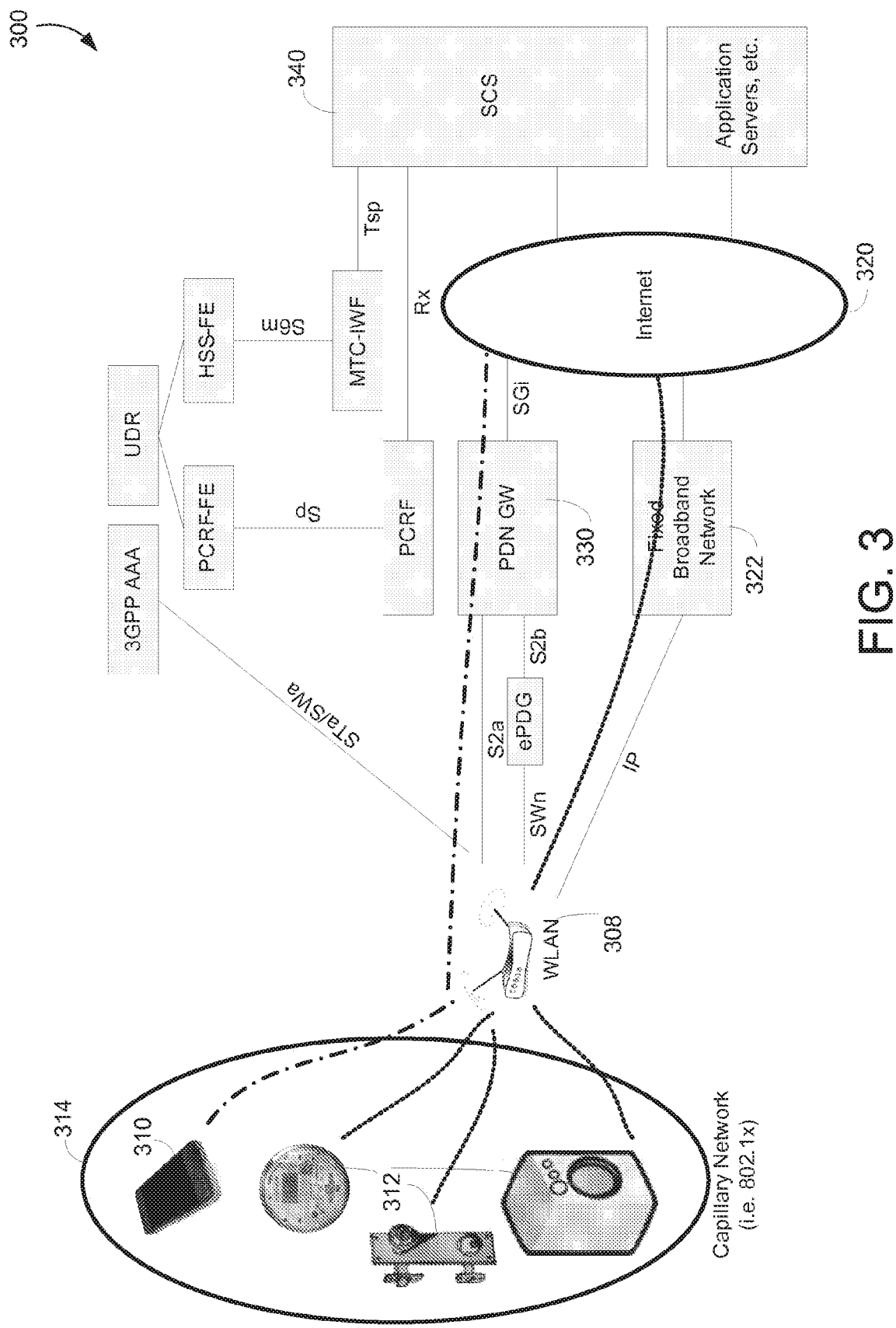
FIG. 3 illustrates an example communication system architecture.

FIG. 3 depicts an example system 300 illustrating operational limitations of existing systems. As shown, UEs 310 and 312 are communicatively coupled with wireless local area network (WLAN) system 308 which may be, for example, a WLAN access point. In an example scenario, the WLAN system 308 may be deployed in the home of a broadband service subscriber. The WLAN 308 may be either a trusted or untrusted system for purposes of access to the EPC network as described above in connection with FIG. 2. UE devices 310 have been provisioned with a subscriber identity such as, for example, an IMSI. UE devices 312 have not been provisioned with subscriber identities.

In an example embodiment, the WLAN 308 allows user equipment (UE) 310, which has been provisioned with a subscriber identity, to access the EPC via an IEEE 802.1x radio access network (RAN), thus offloading data from the cellular RAN. Existing methods for how a UE accesses the EPC via a WLAN is described in 3GPP TS 23.402, the contents of which are hereby incorporated by reference in their entirety. With respect to devices 310 that have been provisioned with an IMSI, the WLAN system 308 may route traffic (represented by a dot-dash line) across the EPC PGW 330 in order to provide access to the Internet 320. When IMSI-based devices connect to the EPC they may be authenticated based on credentials in the device's subscriber identity module (SIM). Credentials in the SIM may also be used to derive security keys so that communication between the device and EPC is secure. A subscriber identity, e.g., IMSI, which may be stored on the SIM, may be included in all charging records that are generated by the EPC.

By contrast, with respect to devices 312 that have not been provisioned with an IMSI, the WLAN system 308 may provide devices 312 with access (represented by dotted lines) to the Internet 320 via fixed broadband network 322. In existing systems, traffic that is related to an IMSI-less device 312 may not be routed through the EPC. Rather, using existing technologies, IMSI-less device traffic may only be routed through the fixed broadband provider's network 322.

Accordingly, when IMSI-based devices connect to the EPC they may be authenticated based on credentials in the device's SIM. Credentials in the SIM may also be used to derive security keys so that communication between the device and EPC is secure. A subscriber identity, which may be stored on the SIM, may be included in all charging records that are generated by the EPC. As existing implementations require an IMSI as the basis for obtaining access to the EPC, using existing technology, IMSI-less devices are not able to access the EPC. Some examples of IMSI-less devices may be smart appliances, internet televisions, and smart meters. Some of these devices may connect to an M2M Server/network service capability layer (NSCL) (e.g., SCS) that has a business relationship with the access network provider and other devices may stream media from various other sources. If a network operator maintains two core networks (e.g., EPC and broadband), it may be desirable to have all devices connect to the Internet via the same core network. By connecting via the EPC, the devices and NSCL (e.g., SCS) may take advantage of the EPC infrastructure. The EPC infrastructure can provide security, QoS, charging support, triggering services, etc.

IMSI-Less Device Processing

Applicant discloses herein systems and methods by which devices that do not have an IMSI provisioned thereon may be granted access to the EPC. The disclosed systems and methods also provide for collecting and recording data specifying which entity should be charged for data flows to the IMSI-less devices over the EPC.

Figure 4:
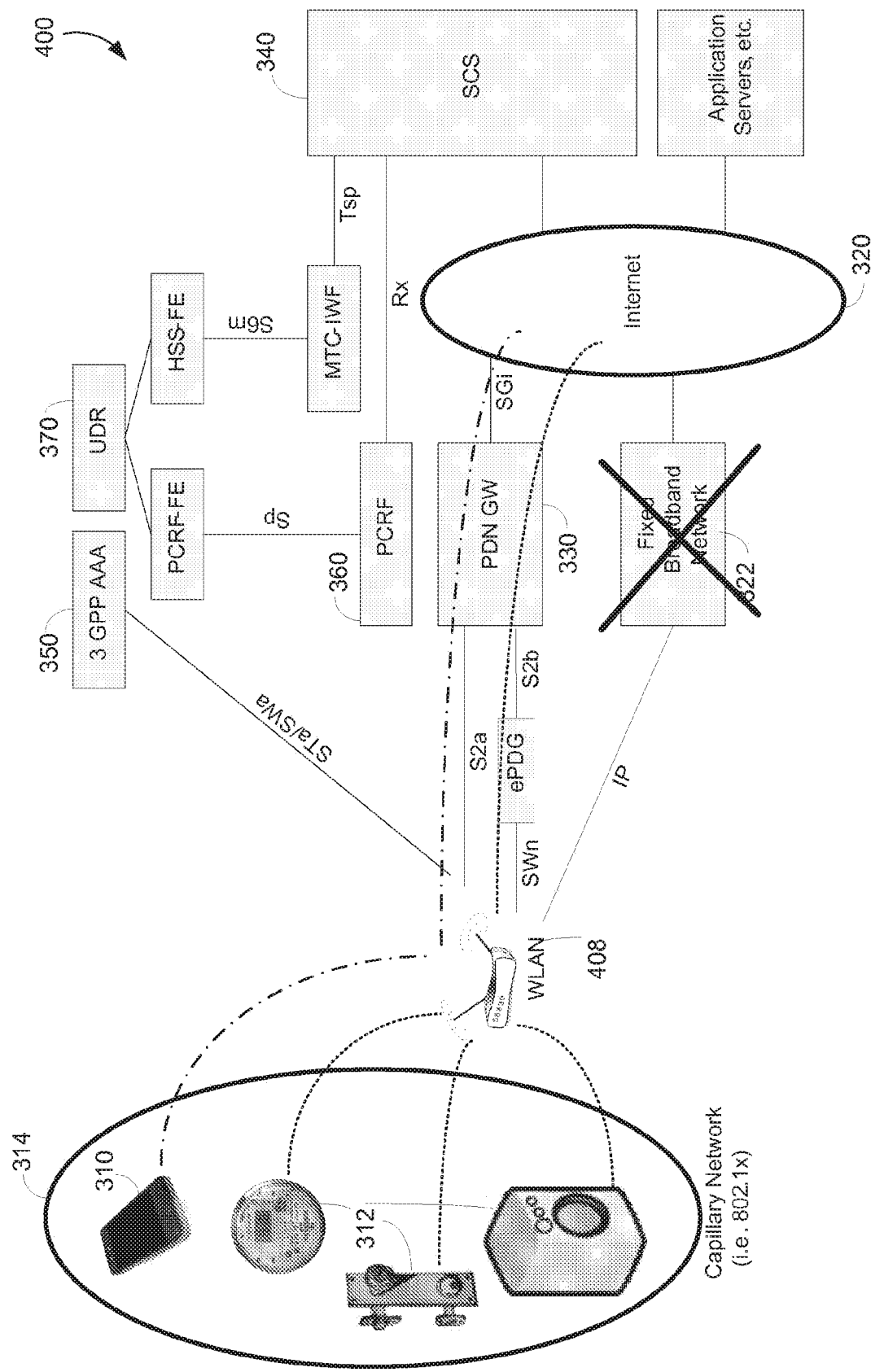
FIG. 4 illustrates an example communication system architecture.

FIG. 4 illustrates an example system wherein the WLAN access point 408 is adapted to provide IMSI-less devices 312 with access over the EPC PDN gateway. More particularly, WLAN access point 408 is adapted to identify devices that do not comprise a subscriber identity, i.e., IMSI-less, and to generate authentication information comprising information sufficient that the device will be provided access over the EPC network. As shown in FIG. 4, requests from device 310 that comprise an IMSI are routed by WLAN 412 over the EPC PDN GW 330 as illustrated by the dot-dash line. Requests from devices 312 that do not comprise an IMSI are likewise routed by WLAN 408 over the EPC PDN GW 330 as illustrated by the dotted lines. WLAN 408 and devices 312 and 310 may be implemented using any suitable computing architecture including, for example, that discussed below in connection with FIG. 8C.

Companies operating fixed broadband networks and mobile networks may wish to route traffic from IMSI-less devices through the EPC and onto the Internet via S2a/S2b/SWn and SGi interface as shown in FIG. 4. This type of deployment may be advantageous to a network operator that must operate an MNO and a fixed broadband network. By deploying a WLAN access point as described herein, for example in the homes of broadband subscribers, a network operator may allow broadband subscribers to be connected to the same core network as mobile subscribers. In this way, capital expenditures may be reduced by using the same EPC infrastructure to provide connectivity to both sets of customers. Although in some such embodiments, the load on the EPC may increase, by removing traffic from the fixed broadband network without introducing additional cellular traffic, overall costs may be reduced and efficiency improved. All traffic in the EPC may also be able take advantage of EPC services such as QoS, sponsored flows, etc.

Identifying IMSI-less devices and routing associated traffic over the EPC network as disclosed herein presents the additional issue of charging for such network traffic. In the disclosed systems, information regarding the device and any relationships with the operator of the EPC network is stored for example, on WLAN 408. This information is used to specify in message flows the entity that should be charged for the data flows corresponding to the connection. The ability to store this information and to incorporate the information into the message flows allows for capturing any number of relationships that determine the entity that should be charged for data flows with the particular device. For example, in order to identify and charge traffic that originates from IMSI-less devices, the WLAN 408 may be configured by the homeowner to accept responsibility for the traffic. Alternatively, the WLAN 408 may indicate to the EPC network that it will allow the traffic if the traffic is sponsored by an application server or if it is compensated for the traffic by the network operator. In another embodiment, if the IMSI-less device has a business relationship with the network operator, then the WLAN 408 may be configured to allow the device to authenticate with the network and obtain a device identifier from the network. In yet another alternative, if the IMSI-less device has a business relationship with a service capability server (SCS) that has a business relationship with the network operator, the WLAN 408 may be configured to allow the device to authenticate with the network. In such embodiments, the IMSI-less device will be expected to indicate its SCS name when it makes the initial contact with the EPC and the EPC will use its interface to the SCS to confirm that the SCS will sponsor the flow. In other embodiments, if the IMSI-less device has a business relationship with an SCS that has a business relationship with the network operator, the SCS can use the Mh interface to provision subscription information for the IMSI-less device in the UDR.

Accordingly, in order to enable IMSI-less device access to the EPC, in some embodiments the attach procedure for non-3GPP access via a Trusted WLAN (TWLAN) may be updated to allow devices to connect without an IMSI. In such embodiments, when a non-UE connects to a WLAN, the WLAN and EPC may be able to assign it an identifier enabling the EPC to map the identifier to the WLAN. Furthermore, when the EPC generates charging records for the non-IMSI device the records may contain enough information to identify the WLAN that was used to connect to the EPC and the Service Layer of the non-IMSI device (if applicable). Certain devices, such as HD televisions that stream content from the internet, may require QoS guarantees. In such embodiments, the WLAN may be able to recognize the QoS requirements and request the QoS from the EPC.

A WLAN access node 408 such as depicted in FIG. 4 that is adapted to connect an IMSI-less device 312 to the EPC 330 may be configured with information in order to perform the processing as described herein. For example, WLAN access node 408 may be provisioned with information that is used to determine which entity should be charged for IMSI-less devices 312 communicating over the EPC 330. In an example scenario, WLAN access node 408 may be provisioned with information identifying that traffic from an IMSI-less device 312 is to be charged to a homeowner who accepts responsibility for the WLAN 408 through which the IMSI-less device 312 is connecting. A homeowner operating such a WLAN may have access to a user interface, such as a graphical user interface (GUI) that can be used to configure the WLAN access node 408. More particularly, an operator may enter information into a user interface specifying particular aspects of how the WLAN is to respond to request from various devices including any limits on what the particular device may access and which entity is responsible for charges resulting from data flows via the WLAN. Table 1 below lists exemplary WLAN settings that may be configured, although other settings are contemplated. While Table 1 does not reference a particular security setting for the WLAN access node 408, it will be appreciated that in most implementations, any non-3GPP access network (e.g., 802.11) will deploy some type of security (e.g., Wi-Fi Protected Access (WPA)). Indeed, the GUI may allow the homeowner to configure the WLAN to allow devices, which do not have the WPA key, to connect to the WLAN if they have a relationship with the network operator or if their traffic will be sponsored by SCS.

TABLE 1

Exemplary WLAN Settings

| Setting | Values |
|---|---|
| WLAN Settings | |
| Allow Visiting IMSI-less Devices To Connect without WPA Keys? | Yes / No |
| Permission level of IMSI-less devices that do not have the WPA key. | Total Access (All Traffic would be charged to homeowner) Sponsored Only (The visiting device would only be allowed to access sponsored sites) Operator Related Only (The visiting device would only be permitted access if it has a relationship with the network operator) No Access |
| Internal WLAN Access | Yes/No |
| Per IMSI-less Device Settings | |
| (The homeowner may configure these setting per connected device) | |
| Non-3GPP Network Device Name | |
| APN Name | TheAPN that will be accessed by the device. This will be used by the WLAN when PDN GW Selection is performed. |
| SCS Name(s) | The name(s) of the SCS(s) that will be accessed by the device. |
| Permission Level | SCS Only, Sponsored Only, Total Access (Optional) |
| Requested QoS | A QoS Setting that will be mapped to an EPC QoS Setting and used during session establishment |

TABLE 1-continued

Exemplary WLAN Settings

| Setting | Values |
| --- | --- |
| Local Routed Traffic Only | A setting to indicate to the WLAN that traffic from the device should only be routed inside of the Local Access Network. It never needs to be routed to the EPC. An example of such a device would be a signal from an On/Off light switch. |

As illustrated by Table 1, in an example embodiment, the WLAN access point 408 may be provisioned with information specifying whether to allow IMSI-less devices to connect, and if so what level of permission to provide. In the example embodiment depicted in Table 1, the WLAN access point 408 may be provisioned with information indicating an IMSI-less device may be provided with the following levels of access via the EPC: total access, in which scenario charges for the traffic are charged to the operator/owner of the WLAN; sponsored only access in which case an IMSI-less device would only be allowed to access sponsored sites; operator related only access, in which case an IMSI-less device would only be permitted access if the device has a relationship with the network operator; and no access.

In an example embodiment, a WLAN access point 408 may be provisioned with information specifying settings specific to individual devices. In an example scenario, a WLAN access point 408 may be provisioned, for each particular device that accesses the WLAN access point 408, with the following information: a non-3GPP device name; an access point name (APN) that the particular device may access which is used by the WLAN 408 in selecting a PDN GW 330; a services capability server (SCS) 340 name identifying an SCS that may be access by the particular device; a permission level specifying whether access should be to the SCS only, a sponsored site only, or total access; a requested quality of service (QOS) that is mapped to a setting within the EPC and which may be used while connecting to the EPC; and an indication to indicate the traffic from the device should be routed only within the local access network services by the WLAN 408, e.g., traffic from an on/off switch that never needs to be routed to the EPC.

Accordingly, in an example embodiment, the WLAN access point 408 is provisioned with information that is used to determine whether IMSI-less devices may access the EPC through the WLAN access point 408. The provisioned information may specify any limitations relating to the access that may be provided such as which sites and services may be accessed. Furthermore, the provisioned information may be employed to specify which entity is responsible for the costs associated with the access. The information is used by the WLAN access point 408 in processing requests from devices. It will be appreciated that while the information in Table 1 is described as being provisioned to and residing on WLAN access point 408, it will be understood that some or all of this information may be alternatively or additionally be provisioned on individual devices as well as on network elements such as 3GPP AAA server 350.

In an example embodiment, capillary network 314 IMSI-less devices 312 may be configured with a device identifier, SCS name, and APN that the particular device may access. For example, in an example scenario a device 312 may be a door lock device and may be configured with the name of an SCS that provides home automation and security services to the device 312, as well as an APN that can be used to reach the device 312. The particular device 312 may be preconfigured with this information or may be adapted with a user interface with which the configuration information to be entered. For example, the device 312 may have one or more buttons, a graphical user interface, or a command line interface that allows users to enter information specifying values for a device identifier, SCS name, and APN. The user interface or another interface may be employed to instruct the device 312 to connect to the WLAN 408. In response, the device 312 connects to the WLAN 408 and provides the WLAN with the device identifier, SCS name, and APN name for the particular device 312. The WLAN 408 uses this information in subsequent requests from the particular device 312 in connecting the device 312 with the EPC.

Figure 5:
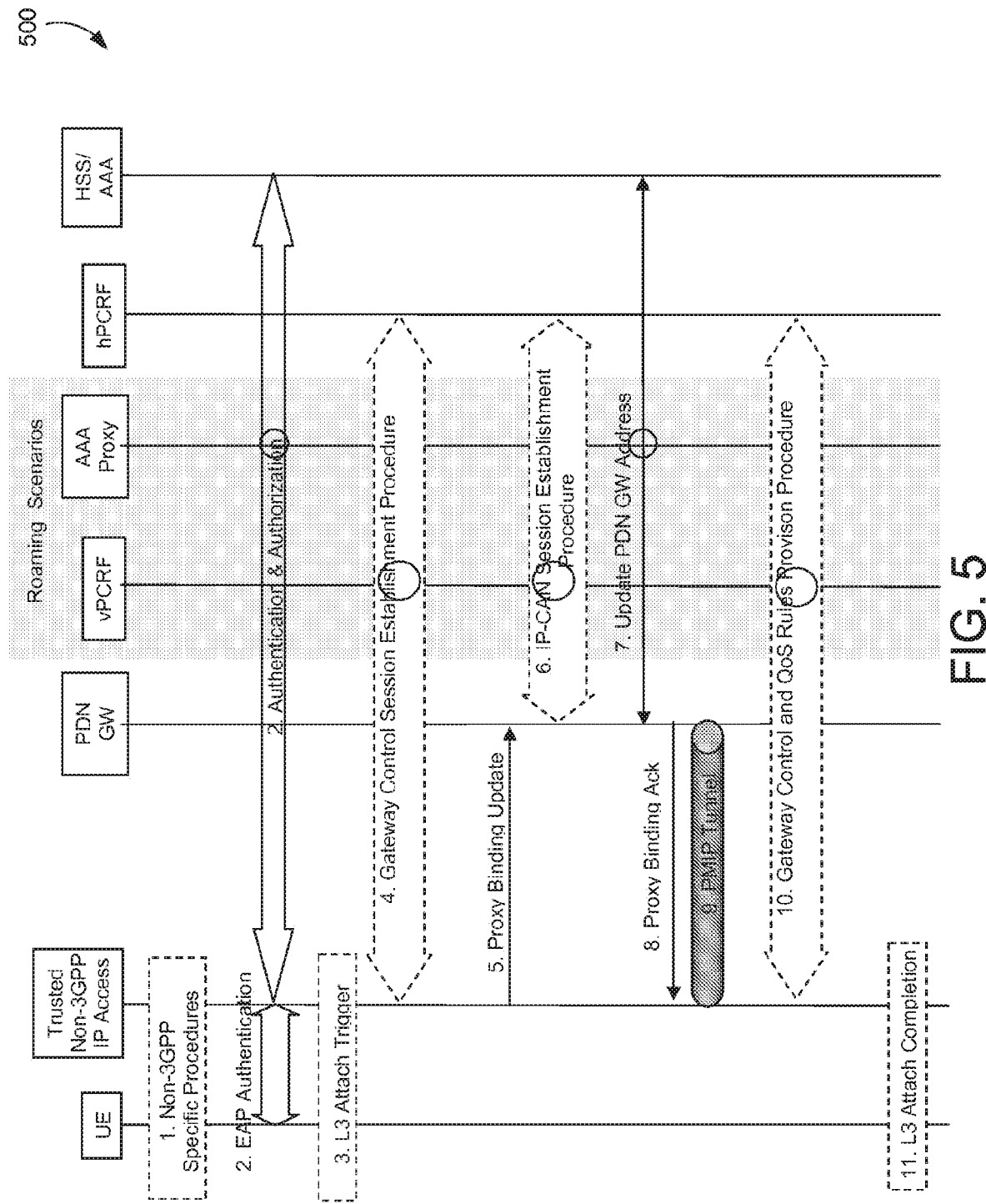
FIG. 5 illustrates an example flow diagram for processing of communication requests.

FIG. 5 depicts flows associated with a WLAN access point 408 processing a request from an IMSI-less device 312 for non-3GPP access. In FIG. 5, the box labelled "Trusted Non-3GPP IP Access" corresponds to WLAN access point 408. At step 1 depicted in FIG. 5, an IMSI-less device 312 may make a request to the WLAN access point 408. The request may request access to a server accessible via the EPC network. At step 1, the device 312 establishes L2 connectivity with the WLAN access point 408.

At step 2, authentication-related processing is performed. Generally, the processing involves the WLAN access point 408 interfacing with the 3GPP AAA server 350 to establish that the communication between the particular device and the EPC is authorized. In the scenario where an IMSI-based UE device 310 attempts to connect to the EPC, the subscriber identity data, e.g., IMSI data, is used by WLAN access point 408 to perform an authentication and authorization exchange with 3GPP AAA server 350.

In the scenario where an IMSI-less UE device 312 attempts to connect to the EPC, the authentication and authorization processing may be different. Upon receipt of the request, WLAN access point 408 determines that the particular device does not comprise a subscriber identity, e.g., IMSI, and uses the provisioned information discussed above in connection with Table 1 to determine whether access may be provided, and if so, any limits that may apply to the requested data flow. WLAN access point 408 identifies and communicates alternative authentication information for use in the authentication and authorization processing. As explained below in connection with FIG. 6, the information retrieved by the WLAN 408 and included in the authentication information may vary depending upon whether or not a relationship exists between the device and the network operator. In the scenario where the WLAN 408 determines based upon the provisioned information that the IMSI-less device 312 has no relationship with the network operator, the WLAN access point 408 may request an identifier on behalf of the device. In an example embodiment, the authentication information may comprise, for example, information specifying limits for providing the device 112 with access to the EPC. For example, the authentication information may specify an identifier for an access point the particular device is permitted to access. In another example, the authentication information may comprise an identifier for an application server that the device is permitted to contact. The WLAN access point 408 retrieves information specifying these limitations from the provisioned information as discussed above in connection with Table 1.

Once authentication processing has been performed, at step 3, attachment between the device 312 and WLAN access point 408 takes place. In some embodiments, no action may need to be taken by the IMSI-less device 312. The WLAN 408 may be required to perform PDN GW selection based on an access point name that was determined during authentication and authorization with the EPC. In other words, the WLAN 408 may have determined that the provisioned information specified for the particular device identifies a particular gateway. For example the provisioned information may identify a particular APN name for the gateway.

At step 4, the WLAN 408 performs a Gateway Control Session Establishment procedure with the PCRF 360 using processes known in the art. The procedure may be performed on the Gxa reference point (see FIG. 2). The Gxa may be a Diameter interface as known to those skilled in the art. The PCRF 360 is configured during the procedure such that charging records associated with the particular session contain the information that is needed to charge the appropriate party. The entity or device with which the data flow is associated for purposes of charging is derived using the information that was provisioned including the information described above in connection with Table 1. In an example embodiment, during the session establishment, a given flow may be associated with the particular device 312, WLAN (customer) 408, and/or an application server AS that was designated for the particular communication session. The control session establishment processing is discussed in further detail below in connection with FIG. 7.

The remaining processing depicted in FIG. 5 is consistent with existing practices. At steps 5 through 8, a proxy binding update, an IP Connectivity Access Network (IP-CAN) Session Establishment Procedure, a PDN GW Address Update, and a proxy binding Acknowledgement are performed, respectively. At step 9, a PMIP Tunnel may be established. At step 10, a GW Control and QoS Rule Provisioning Procedure as known to those skilled in the art may be performed. At step 11, the L3 attach procedure may then be completed and the device may be provided with its IP Address.

Authentication and Authorization

Figure 6:
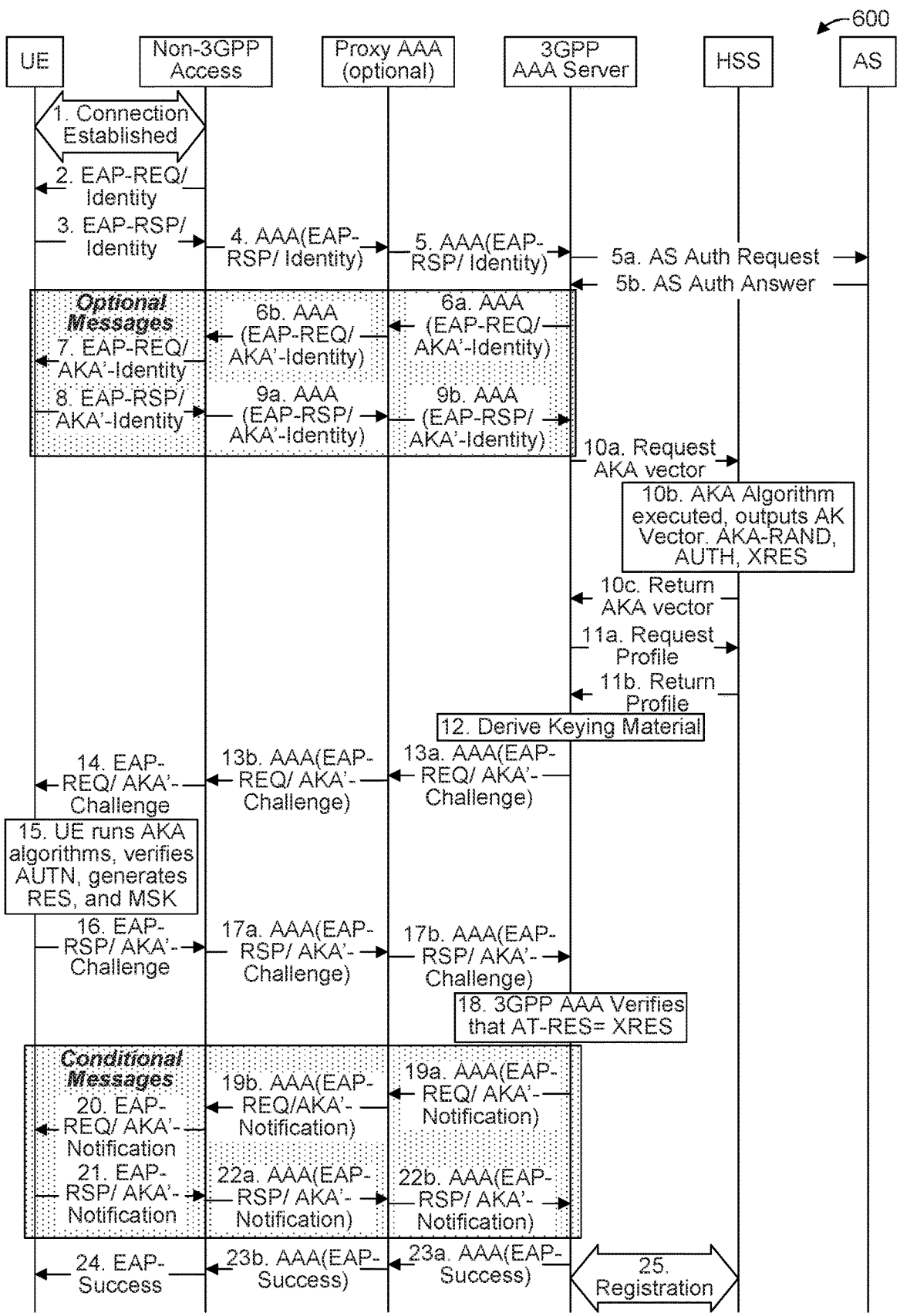
FIG. 6 illustrates an example flow diagram for authentication and authorization processing.

FIG. 6 depicts example signal flow processing performed in connection with authentication and authorization for an IMSI-less device 312. As noted above in connection with step 2 of FIG. 5, the authentication and authorization processing involves the WLAN access point 408 (titled "Non 3GP Access" in FIG. 6) interfacing with the 3GPP AAA server 350 to establish that the communication between the particular device and the EPC is authorized, and, if so, what limitations are there to the communication. Upon receipt of the request, WLAN access point 408 determines that the particular device does not comprise a subscriber identity, e.g., IMSI. WLAN access point 408 retrieves the provisioned information discussed above in connection with Table 1 to determine the manner in which WLAN 408 should respond. If the provisioned information indicates access should be provided, WLAN 408 determines based upon the information any limitations that are imposed upon the access. For example, WLAN 408 may determine that access may be had only to sponsored sites or services. The WLAN 408 further determines from the provisioned information relevant to which entity is responsible for identifies and communicates alternative authentication information for use in the authentication and authorization processing.

The information included in the authentication information generated by the WLAN 408 may vary depending upon whether or not a relationship exists between the device and the network operator. In the scenario wherein the IMSI-less device 312 and a network operator have a relationship, information used in the authentication may have been previously provisioned. For example, the information may have been previously provisioned and stored on the IMSI-less device 312 and the 3GPP Authentication, Authorization, and Accounting (AAA) server 350. In another example embodiment, the information may be provisioned and stored on the WLAN access node 408 and the 3GPP AAA server 350. In an example scenario, the information may be provisioned on the 3GPP AAA server 350 by the SCS 340 first provisioning the information in the user data repository (UDR) 370 when the customer (homeowner) establishes a business relationship with the SCS. The 3GPP AAA server 350 accesses the information from the UDR 370.

Referring to FIG. 6, at step 1, the IMSI-less device 312, which is referenced in FIG. 6 as a UE, establishes a connection with WLAN access node 408. At step 2, an Extensible Authentication Protocol (EAP)-Authentication and Key Agreement (EAP-AKA) authentication request is generated by the WLAN 408 and transmitted to the IMSI-less device 312. It will be understood that with respect to process of requests from IMSI-less devices 312, the Extensible Authentication Protocol may be used to perform an authentication method other than AKA with the 3GPP AAA 350.

At step 3, a response is forwarded from the IMSI-less device 312 to the WLAN 408. At step 4, a response is forwarded from the WLAN 408, and at step 5, the response is received at the 3GPP AAA server 370. In an example embodiment, the information is passed from the WLAN 408 to the 3GPP AAA server 370 on the STa/SWa reference point. The information may be conveyed in fields that may be attributes in the EAP payload of the Diameter-EAP-Request message. Such fields may have names that are similar or identical to the type of information carried in the respective field.

As noted above, the information included in the response reflects the information that has been provisioned. For example, the WLAN 408 (or possibly the device 312) may retrieve provisioned information indicating whether there is a relationship for the device with the network operator, or whether the access is limited to a particular server or requires a particular level of service.

In the scenario wherein the provisioned information indicates the IMSI-less device 312 has a relationship with the operator of the EPC network, the information included in the EAP response may comprise, for example, the following: a device identifier; a subscription identifier; APN name(s); application server (AS) name(s); and a WLAN ID. The device identifier may comprise multiple device identifiers and may be formatted as any suitable identifier type including, for example, a uniform resource identifier (URI), a Mobile Subscriber ISDN Number (MSISDN), a MAC address, etc.

In an example scenario, the subscription identifier may be an IMSI. The subscription identifier may be shared with other devices such as, for example, other devices in the home where the IMSI-less device 312 is located. For example, if the home owner purchases home-automation services from the network provider, the same subscription identifier may be shared by all home automation devices in the home.

The APN name information may comprise identifying information for one or more access point names (APNs) that the device is permitted to access.

The application server name(s) information comprises identifying information for one or more application server (AS) names associated with ASs) that the device is allowed to contact. It will be appreciated that an SCS may be one type of AS. If the device is only allowed to contact a particular SCS and not allowed to contact any other Internet addresses, then this field may be used to indicate the name of the SCS that the device is allowed to contact. The 3GPP AAA may choose to contact the AS (e.g., SCS) and ask it to authorize the connection or it may check that the provided AS name(s) are included in the device's subscription information in the AAA.

The WLAN ID may comprise information such as, for example, a name identifying the WLANs through which the device is allowed to connect.

In an embodiment of the disclosed system where the provisioned information indicates the IMSI-less device 312 and a network operator have no relationship, the WLAN 408 and 3GPP AAA server 350 may negotiate one or more identifiers for the IMSI-less device 312. The WLAN 408 may negotiate settings based on the homeowner's configuration of the WLAN. In some such embodiments, if the EAP identity response indicates that the device will only communicate with a particular AS, then the 3GPP AAA 350 may request authorization for the device 312 from the AS prior to providing the next EAP Request. If the EAP identity response indicates that the connection with the AS must be sponsored, then the 3GPP AAA 350 may also request that the AS to confirm that it will sponsor traffic to/from the device.

In the scenario wherein the IMSI-less device 312 does not have a relationship with the operator of the EPC network, the information included in the EAP response may comprise, for example, the following: a device identifier; a subscription identifier; APN name(s); application server (AS) name(s); permission level, and request quality of service (QoS). The device identifier may comprise multiple device identifiers and may be formatted as any suitable identifier type including, for example, a uniform resource identifier (URI), a Mobile Subscriber ISDN Number (MSISDN), a MAC address, etc.

In an example embodiment, the subscription identifier may be equal to an identifier for the WLAN 408, e.g., a WLAN ID, or may be mapped to the WLAN ID.

The APN name(s) comprise information specifying the name(s) of the APN(s) that the operator/homeowner wishes the device to access.

With respect to application server (AS) name(s), the information comprises information identifying the one or more AS that the device 312 is authorized to contact. Note that an SCS may be a type of AS. If the IMSI-less device 312 is only allowed to contact a particular SCS and not allowed to contact any other internet addresses, this field will be used to indicate the name of the SCS that the device is allowed to contact. The 3GPP AAA may select to contact the AS (SCS) and ask it to authorize the connection.

The permission level information specifies that the device is only allowed to connect for sponsored services.

The requested quality of service (QoS) information indicates the maximum QoS level that should be provided to the IMSI-less device.

Referring again to FIG. 6, after the authentication and authorization response is communicated at step 5 to the 3GPP AAA server 350, at step 5a, the 3GPP AAA server 350 sends an authorization and sponsorship confirmation request (AS Auth Request) to the AS. As noted above, the AS may be, for example SCS 340. At step 5b, the AS sends an authorization and sponsorship confirmation response (AS Auth Answer) to the 3GPP AAA server 350. The response may include an indication of whether or not the UE device 312 should be authorized to access the network and if the AS is willing to sponsor the activity of the UE device 312. The messages in steps 5a and 5b may be communicated over an interface that is based on the Mh reference point 152 and may be sent through the HSS. Alternatively, the request can be sent over an interface that is based on the Tsp reference point 155 and it may be sent through the MTC-IWF. The messaging in steps 5a and 5b shows how M2M devices 312, with no previous relationship with the MNO, can dynamically form a connection with the EPC and access an SCS 340.

Referring to FIG. 6, after step 5, processing continues consistent with defined authentication processing as noted by steps 6 through 24.

Gateway Control Session

As noted above in connection with step 4 of FIG. 5, the WLAN 408 establishes a gateway control session employing information that has been provisioned regarding the particular device and/or WLAN. The information communicated during the establishment of the gateway control session may be employed to designate the entity that will be charged for the data flows occurring over the requested connection.

Figure 7:
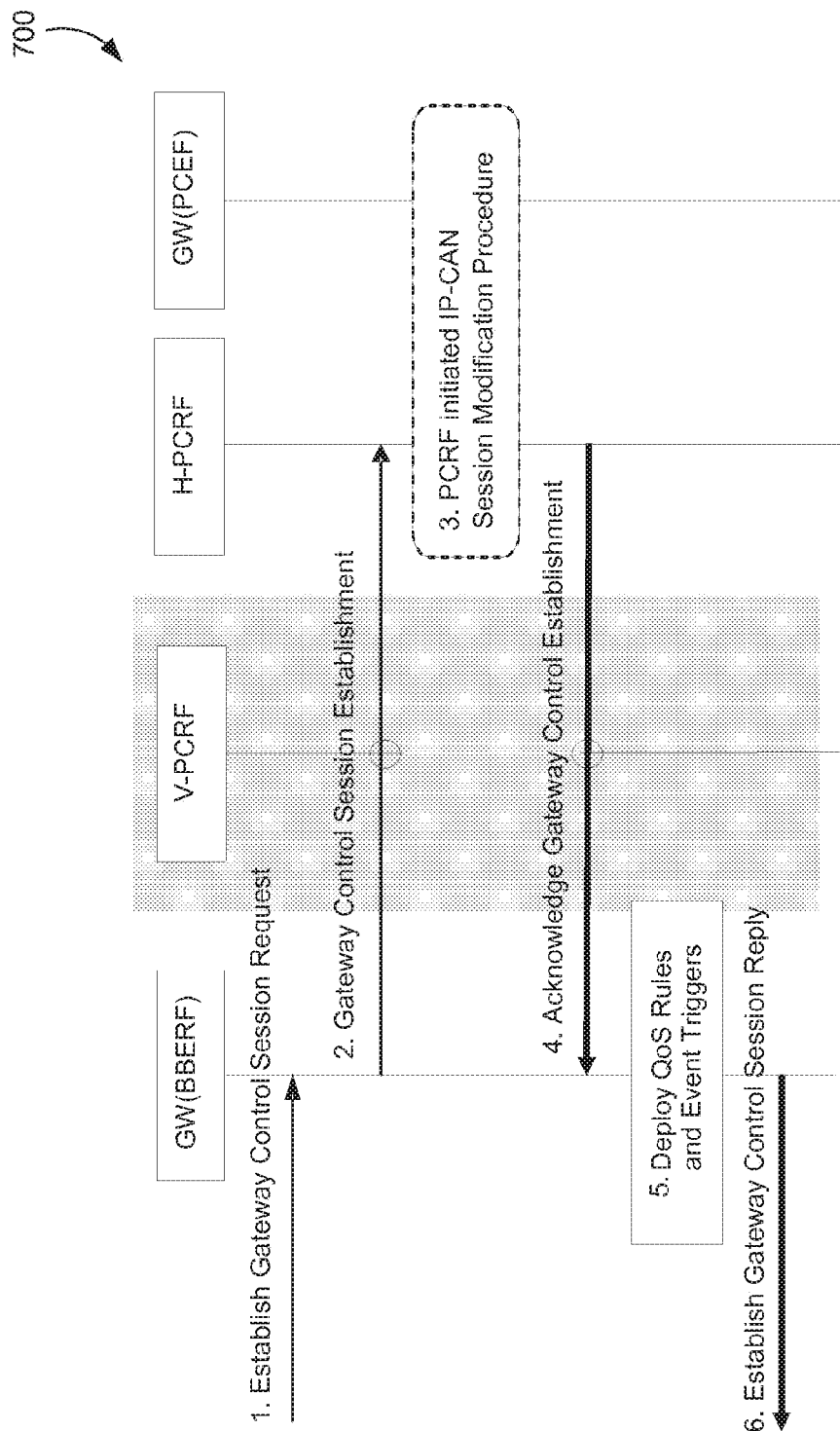
FIG. 7 illustrates an example flow diagram for gateway control processing.

FIG. 7 depicts example signal flow processing performed in connection with gateway control session establishment during an attach procedure for an IMSI-less device 312. As shown at step 1, an established gateway control session request is received at WLAN 408. It will be appreciated that in an initial request from the IMSI-less device 312 to the WLAN 408, there may be no explicit message from the IMSI-less device that requests session establishment. Instead the request may be implied when the IMSI-less device connects to the WLAN.

Referring to FIG. 7, at step 2, the WLAN 408 establishes a data plane session for the IMSI-less device 312 by sending a CCR diameter command on the Gxa reference point (see FIG. 2). The attribute value pairs (AVPs) in the CCR command comprise the Subscription-ID AVP, the User-Equipment-Info AVP, and the Sponsorship-Requirement AVP. In an example embodiment, WLAN 408 may rely upon previously specified values and information specified in the previously provisioned information to specify values for the AVPs.

The content of the Subscription-Id AVP may vary depending upon whether or not the IMSI-less device 312 has a relationship with the provider of the EPC network. In the scenario where the WLAN 408 determines that such a relationship between the device 312 and the network operator exists, the WLAN 408 formats the Subscription-I6D AVP with the subscription identifier that was provided by the IMSI-less device 312 and approved during the authentication and authorization procedure with the 3GPP AAA 350. The subscription identifier may have any format that is suitable for performing the operations described herein. In an example scenario, the subscription identifier may be IMSI based, but other embodiments may be used.

In an embodiment where the WLAN 408 determines from the previously provisioned information that the IMSI-less device has no relationship with the access network provider, the Subscription-Id AVP may be populated with a value that identifies the WLAN 408. In an example scenario, the Subscription-Id AVP identifies the same WLAN as the AN-GW-Address AVP.

The User-Equipment-Info AVP may be set to a value that was provided by the device 312 during the authentication and authorization procedure with the 3GPP AAA 350. Alternatively, or in addition, the User-Equipment-Info AVP may be set to the value that was provided by the 3GPP AAA 350 during the authentication and authorization procedure with the device 312.

The Sponsorship-Requirement AVP may be used with a CCR command to indicate whether or not the flow must be sponsored. For example, the Sponsorship-Requirement AVP indicates whether or not the communication must be sponsored by an SCS 340. The WLAN 408 may refer to the previously provisioned information to identify whether or not the connection must be sponsored.

Referring again to FIG. 7, and step 3, the PCRF 360 and Policy and Charging Enforcement Function (PCEF) (P-GW) 330 may perform a session modification procedure. In an example scenario, the P-GW 330 sends a message that initiates or modifies the IP-CAN session. The P-GW 330 starts the process by sending a Credit Control Request (CCR) Command over the Gx interface. The message may include the TFT-Packet-Filter-Information AVP for each requested packet filter. The grouped AVP may be updated to include the Sponsorship-Requirement AVP which indicates the sponsorship requirements of the flow. In an example scenario, the PCRF 360 may check if the IP address that the device 312 wishes to contact is associated with an application function (AF) that is willing to sponsor the flow. The PCRF may choose to dynamically contact the AF to check if it is willing to sponsor the flow.

The PCRF 360 responds to the IP-CAN session modification request by sending the Credit Control Answer (CCA) Command over the Gx interface. This message may include the Charging-Rule-Install AVP for each packet filter. The Charging-Rule-Install AVP is a grouped AVP that may include the Charging-Rule-Definition AVP. The Charging-Rule-Definition is a grouped AVP that may include in some embodiments an AVP that indicates the sponsorship status of the flow (e.g., a Sponsorship-Status AVP as described herein).

Referring again to FIG. 7, at step 4, the PCRF 360 acknowledges the gateway control establishment by sending a CCA diameter command on the Gxa reference point. A CCA command may include a Sponsorship-Status requirement AVP as described herein that may be used to indicate if the flow must be sponsored.

At step 5, the WLAN system 408 deploys quality of service rules and event triggers. And at step 6, the WLAN system 408 transmits a reply to the IMSI-less device 312.

Messages and AVPs

In the above discussions relating to FIGS. 6 and 7, reference was made to several messages and AVPs. In particular, reference was made to the Credit Control Request (CCR) message and the Credit Control Answer (CCA) message.

Credit Control Request Message

The Credit Control Request (CCR) message of the Gx interface may include a Sponsorship-Requirement AVP as described herein. The Sponsorship-Requirement AVP may be included in the TFT-Packet-Filter-Information AVP, which may be a grouped AVP.

Credit Control Answer Message

A Credit Control Answer (CCA) message of the Gx interface may include a Sponsorship-Status AVP as described herein. The Sponsorship-Status AVP may be included in the Charging-Rule-Definition AVP, which may be a grouped AVP. The Charging-Rule-Definition AVP may be included inside of the Charging-Rule-Install AVP, which may also be a grouped AVP.

Sponsorship-Requirement AVP

A Sponsorship-Requirement AVP is comprised in a CCR message and is used to store a sponsorship requirement for each packet filter. A Sponsorship-Requirement AVP may be included in the TFT-Packet-Filter-Information AVP, which may be a grouped AVP contained in the CCR message. The Sponsorship-Requirement AVP supports the following values:

NO_SPONSOR_REQUIRED 0
    Indicates that the UE does not require a sponsor for this flow
SPONSOR_REQUIRED 1
    Indicates that the UE requires this flow to be sponsored, otherwise, the flow should not be allowed
COMPENSATION_REQUIRED 2
    Indicates that the UE requires compensation for allowing this flow, otherwise, the flow should not be allowed Sponsorship-Status AVP A Sponsorship-Status AVP is comprised in a CCA message and is used to store a sponsorship status for charging purposes. A Sponsorship-Status AVP may be included in the Charging-Rule-Definition AVP, which may be a grouped AVP that is already part of the CCA message. The Sponsorship-Status AVP supports the following values:

NO_SPONSOR 0
    Indicates that the flow has no sponsor
SPONSORED_WITHOUT_COMPENSATION 1
    Indicates that the flow is sponsored, but the UE will not be compensated for allowing the flow
SPONSORED_WITH_COMPENSATION 2
    Indicates that the flow is sponsored and that the UE will be compensated for allowing the flow Accordingly, as illustrated by the discussion relating to FIG. 7, the information specified in message flows may be used to specify the entity that should be charged for data flows over a particular connection. The ability to store information relating to charging for data flow and to incorporate the information into the message flows allows for capturing any number of relationships that determine the entity that should be charged for data flows with the particular device. For example, in order to identify and charge traffic that originates from IMSI-less devices, the WLAN 408 may be configured by the homeowner to accept responsibility for the traffic. Alternatively, the WLAN 408 may indicate to the EPC network that it will allow the traffic if the traffic is sponsored by an application server or if it is compensated for the traffic by the network operator. In another embodiment, if the IMSI-less device has a business relationship with the network operator, then the WLAN 408 may be configured to allow the device to authenticate with the network and obtain a device identifier from the network. In yet another alternative, if the IMSI-less device has a business relationship with an service capability server (SCS) that has a business relationship with the network operator, the WLAN 408 may be configured to allow the device to authenticate with the network. In such embodiments, the IMSI-less device will be expected to indicate its SCS name when it makes the initial contact with the EPC and the EPC will use its interface to the SCS to confirm that the SCS will sponsor the flow. In other embodiments, if the IMSI-less device has a business relationship with an SCS that has a business relationship with the network operator, the SCS can use the Mh interface to provision subscription information for the IMSI-less device in the UDR.

Example Computing Environment

Figure 8A:
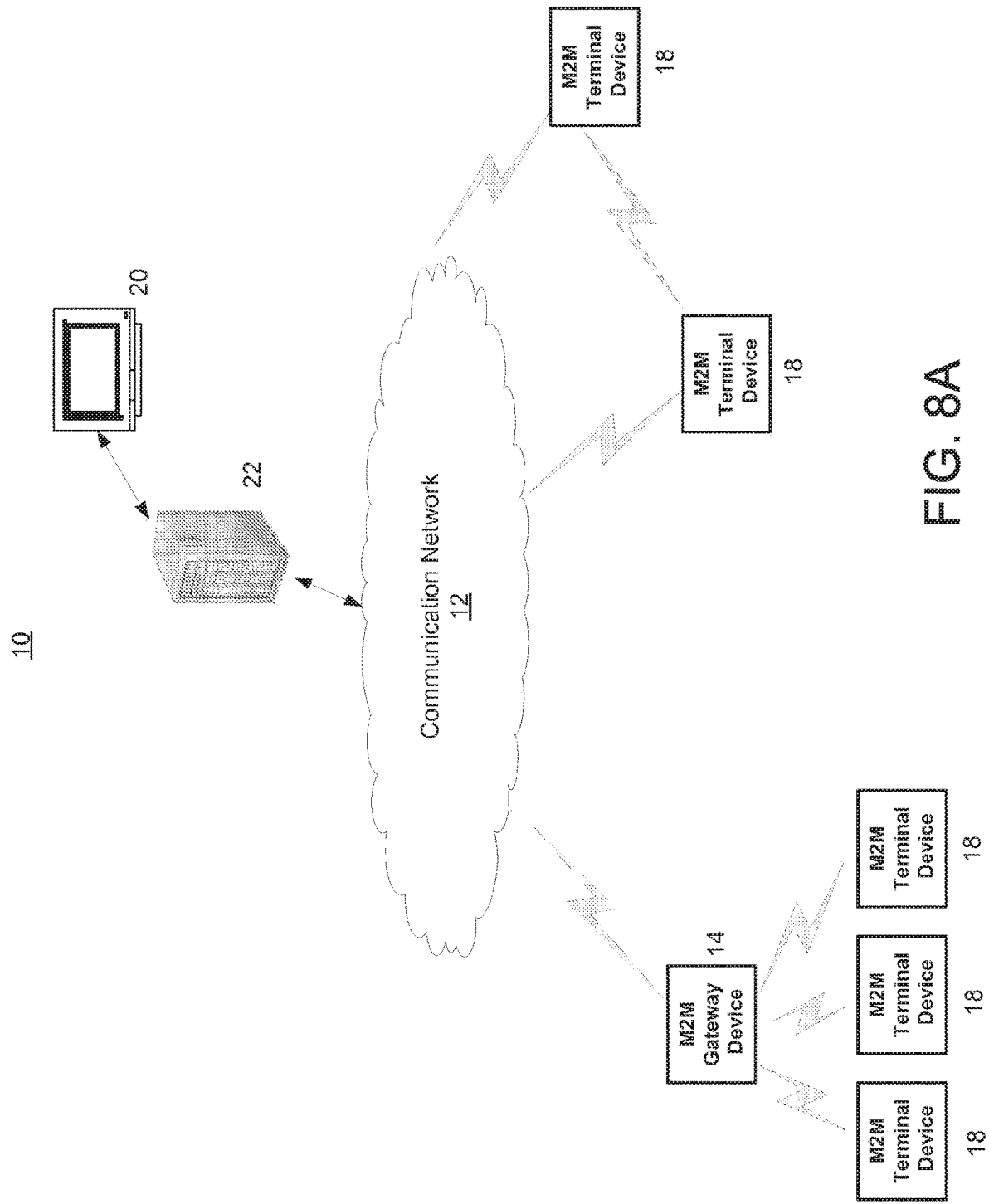
FIG. 8A is a system diagram of an example machine-to-machine (M2M) or Internet of Things (IoT) communication system.

FIG. 8A is a diagram of an example machine-to machine (M2M) or Internet of Things (IoT) communication system 10 in which one or more disclosed embodiments of systems and methods for connecting IMSI-less devices to the EPC may be implemented. Generally, M2M technologies provide building blocks for the IoT, and any M2M device, gateway or service platform may be a component of the IoT as well as an IoT service layer, etc.

As shown in FIG. 8A, the M2M/IoT communication system 10 includes a communication network 12. The communication network 12 may be a fixed network or a wireless network (e.g., WLAN, cellular, or the like) or a network of heterogeneous networks. For example, the communication network 12 may comprise of multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 8A, the M2M/IoT communication system 10 may include an M2M gateway device 14, and M2M terminal devices 18. It will be appreciated that any number of M2M gateway devices 14 and M2M terminal devices 18 may be included in the M2M/IoT communication system 10 as desired. Each of the M2M gateway devices 14 and M2M terminal devices 18 may be configured to transmit and receive signals via the communication network 12 or direct radio link. The M2M gateway device 14 allows wireless M2M devices (e.g., cellular and non-cellular) as well as fixed network M2M devices (e.g., PLC) to communicate either through operator networks, such as the communication network 12, or through direct radio link. For example, the M2M devices 18 may collect data and send the data, via the communication network 12 or direct radio link, to an M2M application 20 or M2M devices 18. The M2M devices 18 may also receive data from the M2M application 20 or an M2M device 18. Further, data and signals may be sent to and received from the M2M application 20 via an M2M service platform 22, as described below. M2M devices 18 and gateways 14 may communicate via various networks including, cellular, WLAN, WPAN (e.g., Zigbee, 6LoW-PAN, Bluetooth), direct radio link, and wireline for example.

The illustrated M2M service platform 22 provides services for the M2M application 20, M2M gateway devices 14, M2M terminal devices 18, and the communication network 12. It will be understood that the M2M service platform 22 may communicate with any number of M2M applications, M2M gateway devices 14, M2M terminal devices 18, and communication networks 12 as desired. The M2M service platform 22 may be implemented by one or more servers, computers, or the like. The M2M service platform 22 provides services such as management and monitoring of M2M terminal devices 18 and M2M gateway devices 14. The M2M service platform 22 may also collect data and convert the data such that it is compatible with different types of M2M applications 20. The functions of the M2M service platform 22 may be implemented in a variety of ways, for example as a web server, in the cellular core network, in the cloud, etc.

Figure 8B:
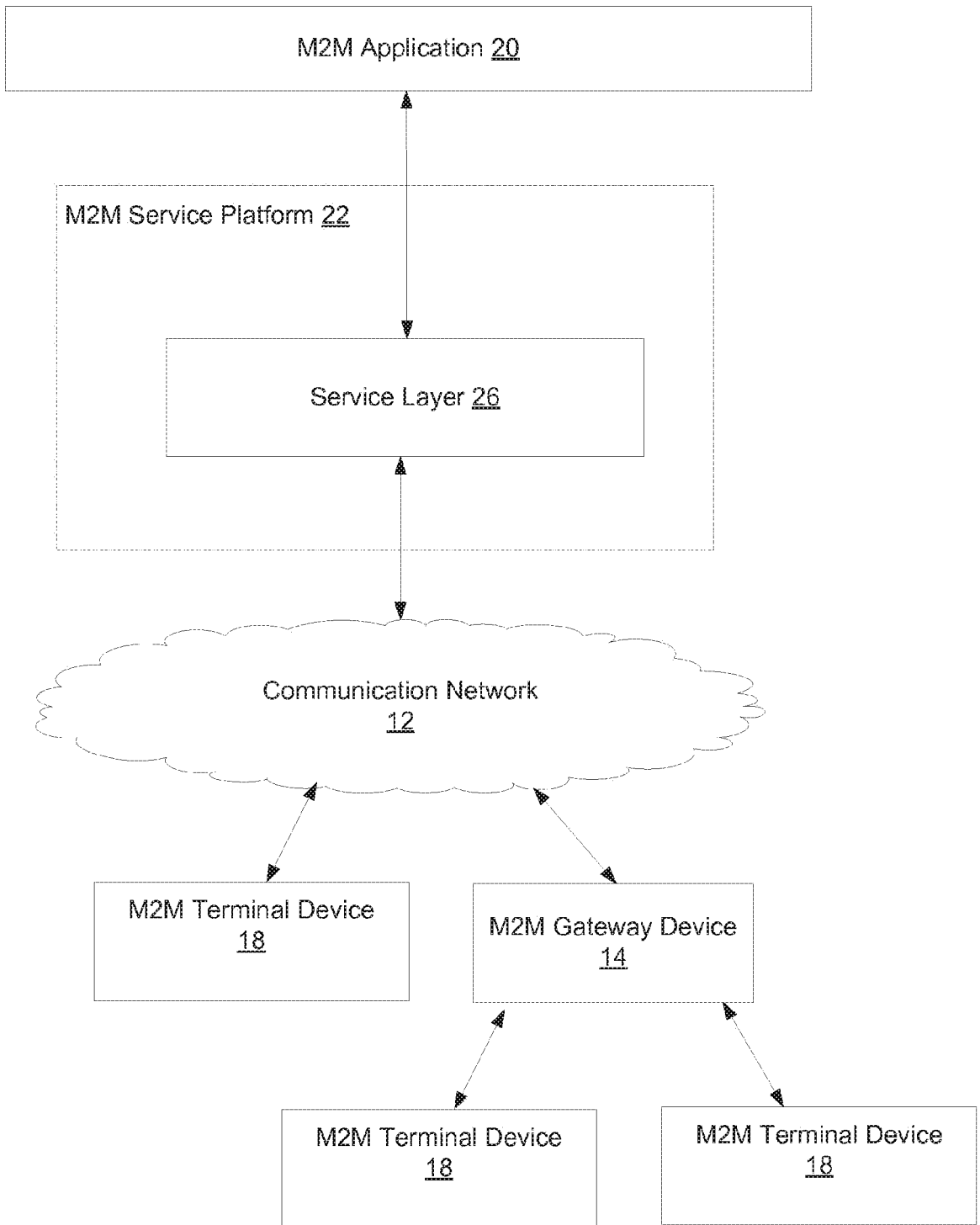
FIG. 8B is a system diagram of an example architecture that may be used within the M2M/IoT communications system illustrated in FIG. 8A.

Referring also to FIG. 8B, the M2M service platform typically implements a service layer 26 that provides a core set of service delivery capabilities that diverse applications and verticals can leverage. These service capabilities enable M2M applications 20 to interact with devices and perform functions such as data collection, data analysis, device management, security, billing, service/device discovery, etc. Essentially, these service capabilities free the applications of the burden of implementing these functionalities, thus simplifying application development and reducing cost and time to market. The service layer 26 also enables M2M applications 20 to communicate through various networks 12 in connection with the services that the service layer 26 provides.

In some embodiments, M2M applications 20 may include the applications that interact with capillary devices and therefore may be used in conjunction with the disclosed systems and methods for connecting IMSI-less devices to the EPC. M2M applications 20 may include applications in various industries such as, without limitation, transportation, health and wellness, connected home, energy management, asset tracking, and security and surveillance. As mentioned above, the M2M service layer, running across the devices, gateways, and other servers of the system, supports functions such as, for example, data collection, device management, security, billing, location tracking/geofencing, device/service discovery, and legacy systems integration, and provides these functions as services to the M2M applications 20. The applications with which the described service layer and objects interact may be applications such as those of M2M applications 20.

Figure 8C:
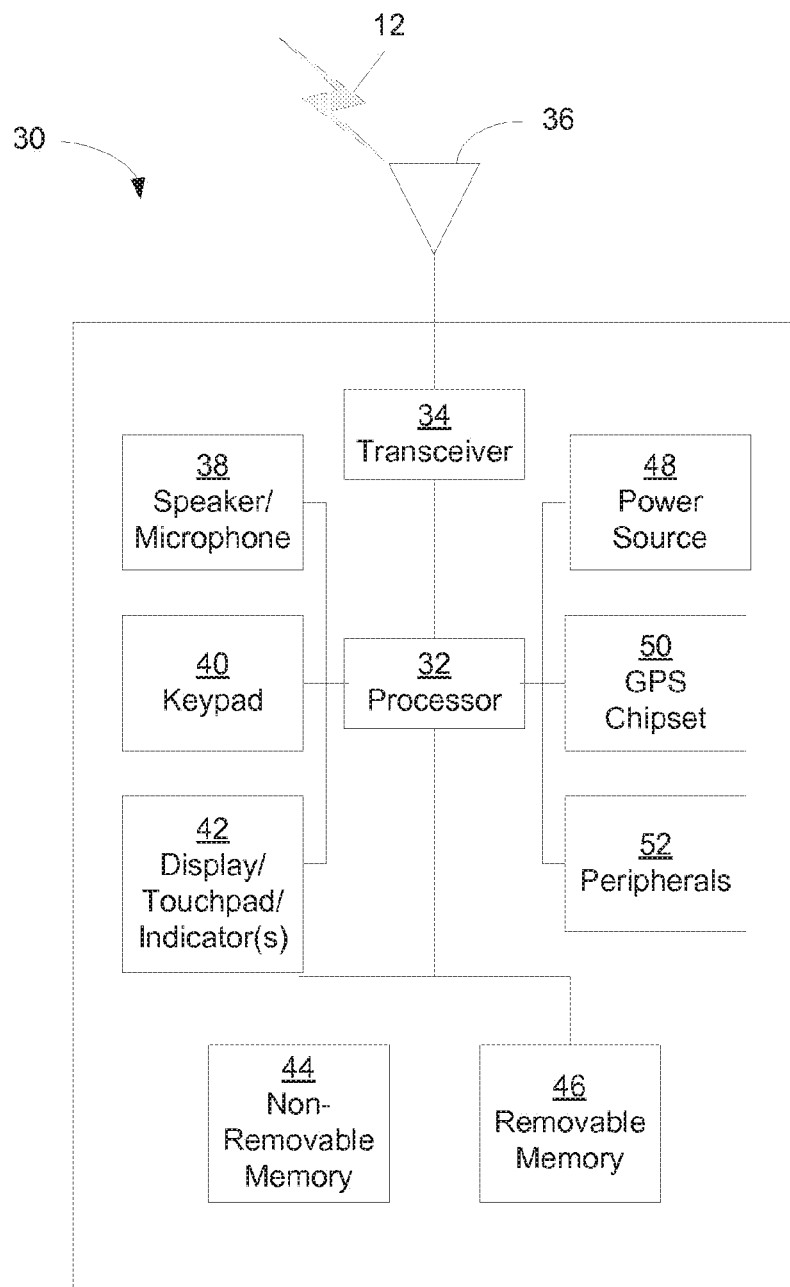
FIG. 8C is a system diagram of an example M2M/IoT terminal or gateway system that may be used within the communications system illustrated in FIG. 8A.

FIG. 8C is a system diagram of an example M2M device 30, such as an M2M terminal device 18 or an M2M gateway device 14, for example. Device 30 may be used to implement, for example, user equipment (UE) such as, for example, any of devices 310 and 312 described above. Likewise, any of the gateways described above such as, for example PDN GW 330 may be implemented using device 330. Moreover, WLAN access device 408 may be implemented using device 30. Accordingly, the functionality described above as being performed by WLAN 408 may be implemented on a device such as device 30. As shown in FIG. 8C, the M2M device 30 may include a processor 32, a transceiver 34, a transmit/receive element 36, a speaker/microphone 38, a keypad 40, a display/touchpad/indicator(s) 42, non-removable memory 44, removable memory 46, a power source 48, a global positioning system (GPS) chipset 50, and other peripherals 52. In an example embodiment, display/touchpad/indicator(s) 42 may comprise one or more indicators that operate as part of a user interface. It will be appreciated that the M2M device 40 may include any sub-combination of the foregoing elements while remaining consistent with an embodiment. This device may be a device that uses and/or implements the disclosed systems and methods for connecting IMSI-less devices to the EPC.

The processor 32 may be a general purpose processor, a special purpose processor, a conventional processor, a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGAs) circuits, any other type and number of integrated circuits (ICs), a state machine, and the like. The processor 32 may perform signal coding, data processing, power control, input/output processing, and/or any other functionality that enables the M2M device 30 to operate in a wireless environment. The processor 32 may be coupled to the transceiver 34, which may be coupled to the transmit/receive element 36. While FIG. 8C depicts the processor 32 and the transceiver 34 as separate components, it will be appreciated that the processor 32 and the transceiver 34 may be integrated together in an electronic package or chip. The processor 32 may perform application-layer programs (e.g., browsers) and/or radio access-layer (RAN) programs and/or communications. The processor 32 may perform security operations such as authentication, security key agreement, and/or cryptographic operations, such as at the access-layer and/or application layer for example.

The transmit/receive element 36 may be configured to transmit signals to, and/or receive signals from, an M2M service platform 22. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 8C as a single element, the M2M device 30 may include any number of transmit/receive elements 36. More specifically, the M2M device 30 may employ MIMO technology. Thus, in an embodiment, the M2M device 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the M2M device 30 may have multi-mode capabilities. Thus, the transceiver 34 may include multiple transceivers for enabling the M2M device 30 to communicate via multiple RATs, such as UTRA and IEEE 802.11, for example.

The processor 32 may access information from, and store data in, any type of suitable memory, such as the non-removable memory 44 and/or the removable memory 46. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the M2M device 30, such as on a server or a home computer.

The processor 30 may receive power from the power source 48, and may be configured to distribute and/or control the power to the other components in the M2M device 30. The power source 48 may be any suitable device for powering the M2M device 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which may be configured to provide location information (e.g., longitude and latitude) regarding the current location of the M2M device 30. It will be appreciated that the M2M device 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 8D:
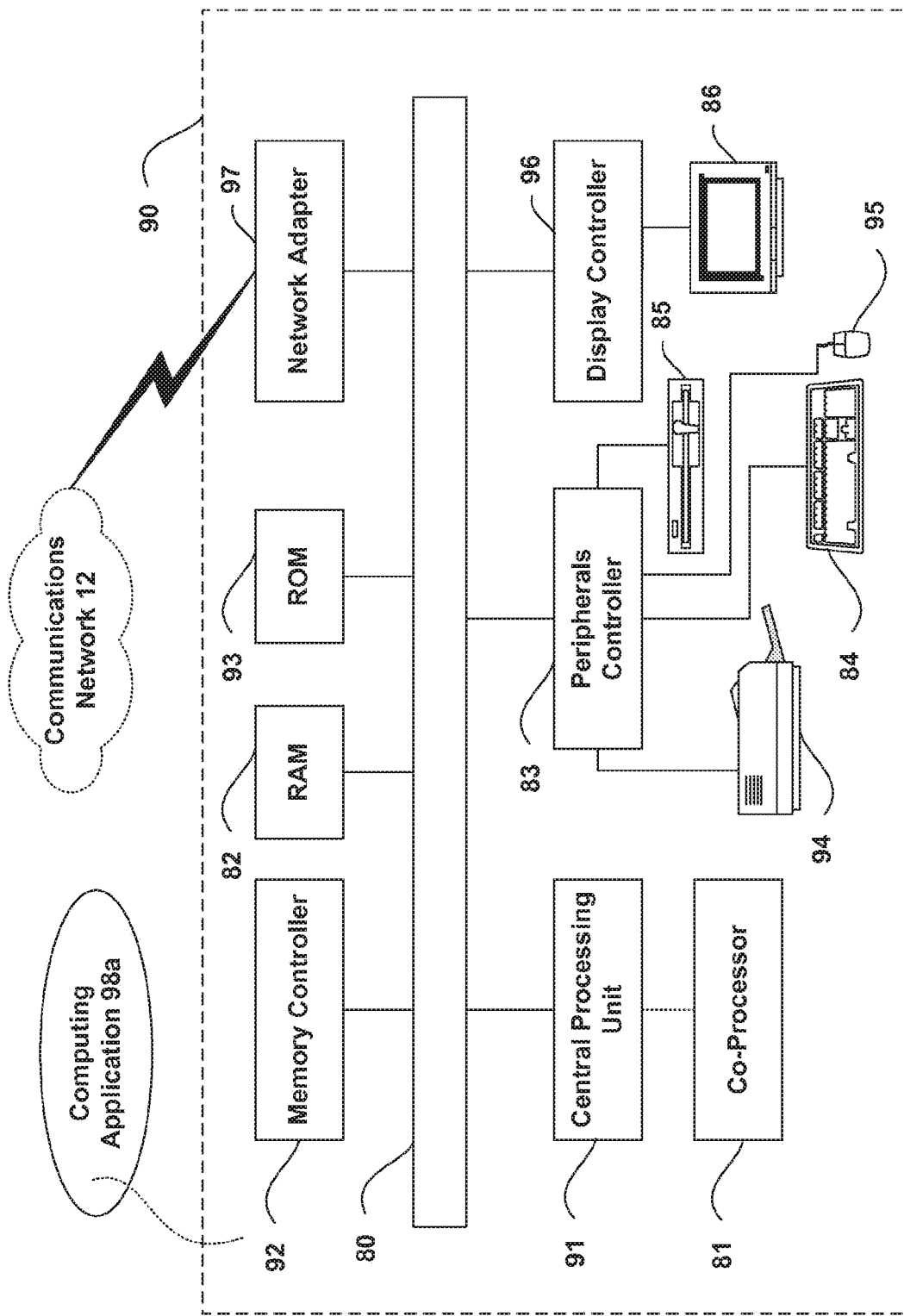
FIG. 8D is a block diagram of an example computing system in which aspects of the communication system of FIG. 8A may be embodied.

FIG. 8D is a block diagram of an exemplary computing system 90 on which, for example, the M2M service platform 22 of FIGS. 8A and 8B may be implemented. System 90 may be used to implement any number of devices noted above in connection with FIGS. 1-7. For example, 3GPP AAA server 350 and SCS 340 may be implemented using system 90. Computing system 90 may comprise a computer or server and may be controlled primarily by computer readable instructions, which may be in the form of software, wherever, or by whatever means such software is stored or accessed. Such computer readable instructions may be executed within central processing unit (CPU) 91 to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91 that performs additional functions or assists CPU 91. CPU 91 and/or coprocessor 81 may receive, generate, and process the data used in various embodiments of the disclosed systems and methods for connecting IMSI-less devices to the EPC.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory devices coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain network adaptor 97 that may be used to connect computing system 90 to an external communications network, such as network 12 of FIGS. 8A and 8B. In an embodiment, network adaptor 97 may receive and transmit data used by various disclosed systems and methods for connecting IMSI-less devices to the EPC.

It is understood that any or all of the systems, methods, and processes described herein may be embodied in the form of computer executable instructions (i.e., program code) stored on a computer-readable storage medium. Such instructions, when executed by a machine, such as a computer, server, M2M terminal device, M2M gateway device, or the like, perform and/or implement the systems, methods and processes described herein. Specifically, any of the steps, operations or functions described above may be implemented in the form of such computer executable instructions. Computer readable storage media include both volatile and nonvolatile, removable and non-removable media implemented in any method or technology for storage of information, but such computer readable storage media do not include signals. Computer readable storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other physical medium that can be used to store the desired information and that can be accessed by a computer.

Accordingly, applicant has disclosed systems and methods for providing devices that lack subscriber identity information with access to an EPC network. In a typical scenario, requests to access application servers such as a Web page server are received at a WLAN access node. The WLAN access node, which may be, for example, a wireless router, may be communicatively coupled to a broadband network, but may also have a path to an EPC network. The WLAN access node is programmed to recognize a device is lacking a subscriber identity (IMSI) and to generate an authentication request providing a value for a subscriber identity and identifying any limits on the access the particular device has through the EPC. For example, the WLAN may generate an authentication request that comprises information intended to limit the particular server or application that the device may access via the EPC. The information contained in the authentication request may also specify which entity may be charged for any flows that may occur over the requested connection.

It will be appreciated that while illustrative embodiments have been disclosed, the scope of potential embodiments is not limited to those explicitly set out. For example, while the system has been described with primary reference to information for use in processing being provisioned at a WLAN access node, the envisioned embodiments extend as well to embodiments wherein the data may be stored on other devices such as, for example, the user devices.

It should be understood that the various techniques described herein may be implemented in connection with hardware or software or, where appropriate, with a combination of both. Thus, the methods and apparatus of the subject matter described herein, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the subject matter described herein. In the case where program code is stored on media, it may be the case that the program code in question is stored on one or more media that collectively perform the actions in question, which is to say that the one or more media taken together contain code to perform the actions, but that—in the case where there is more than one single medium—there is no requirement that any particular part of the code be stored on any particular medium. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the subject matter described herein, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although example embodiments may refer to utilizing aspects of the subject matter described herein in the context of one or more stand-alone computer systems or devices, the subject matter described herein is not so limited, but rather may be implemented in connection with any computing environment, such as a network or distributed computing environment. Still further, aspects of the subject matter described herein may be implemented in or across a plurality of processing chips or devices, and storage may similarly be affected across a plurality of devices. Such devices might include personal computers, network servers, handheld devices, supercomputers, or computers integrated into other systems such as automobiles and airplanes.

The following is a list of acronyms relating to 3GPP and networking technologies that may appear in the above description.

AS Application Server
AF Application Function
APN Access Point Name
AVP Attribute Value Pair
BD Billing Domain
CA Certificate Authority
CDF Charging Data Function
CGF Charging Gateway Function
CN Core Network
CTF Charging Trigger Function
EAP Extensible Authentication Protocol
EAP-AKA EAP Authentication and Key Agreement
EPC Evolved Packet Core
EPS Evolved Packet System
ExID External Identifier HSS Home Subscriber Server
HLR Home Location Register
IANA Internet Assigned Numbers Authority
IP-CAN IP Connectivity Access Network
GW Gateway
MM Mobility Management
MNO Mobile Network Operator
MS Mobile Station
MTC Machine Type Communication
MTC-IWF MTC Inter-Working Function
OCS Online Charging System
OFCS Offline Charging System
PCRF Policy and Charging Rules Function
PDN Packet Data Network
RAI Routing Area Identity
SCS Services Capability Server
SM Session Management
SIM Subscriber Identity Module
SPR Subscription Profile Repository
TAI Tracking Area Identity
TFT Traffic Flow Template
TWLAN Trusted Wireless Local Area Network WLAN
UDR User Data Repository
UE User Equipment
WLAN Wireless Local Area Network Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A device for communicating with a network, the device comprising:
   a computing processor; and
   computing memory communicatively coupled with the computing processor, the computing memory having stored therein executable computing instructions for performing operations, comprising:
      store information related to services that the device can access via a core network, the information comprises a name that is indicative of at least one service that is allowed to be accessed by the device;
      transmit a device identifier and the name that is indicative of the at least one service;
      receive an Extensible Authentication Protocol (EAP) request from the network;
      transmit, to the network, an EAP response comprising the device identifier and the name that is indicative of the at least one service, wherein the name and the device identifier are different; and
      perform an EAP authentication with an Authentication, Authorization, and Accounting (AAA) server for accessing the at least one service.

2. The device of claim 1, wherein the name is indicative of an access point name (APN).

3. The device of claim 2, wherein the information is provisioned with the device identifier.

4. The device of claim 1, wherein the device is a wireless transmit/receive unit (WTRU).

5. A network node communicating with a terminal device, the network node comprising:
   a computing processor; and
   computing memory communicatively coupled with the computing processor, the computing memory having stored therein executable computing instructions for performing operations, comprising:
      transmitting an Extensible Authentication Protocol (EAP) request to the terminal device;
      receiving, from the terminal device, an EAP response comprising a device identifier and a name that is indicative of at least one service;
      identifying, based on the EAP response that comprises the device identifier and the name that is indicative of the at least one service, an Authentication, Authorization, and Accounting (AAA) server to send an authentication request for the terminal device; and
      relaying an EAP authentication messages between the identified AAA server and the terminal device.

6. The network node of claim 5, wherein the EAP response further comprises at least one of subscription identifier, wireless local area network identifier (WLAN ID), or access point name (APN).

7. The network node of claim 5, wherein the terminal device is a wireless transmit/receive unit (WTRU).

8. A system for communicating with a terminal device, the system comprises at least a network node and Authentication, Authorization, and Accounting (AAA) server, the system comprising:
   provisioning first information on the terminal device, the first information relating to services that the terminal device can access via a core network;
   provisioning second information on the AAA server, the second information relating to authenticating the terminal device for accessing services;
   transmitting, by the network node, an Extensible Authentication Protocol (EAP) request to the terminal device;
   receiving, by the terminal device, the EAP request from the network node;
   transmitting, by the terminal device, an EAP response comprising a device identifier and a name that is indicative of at least one service;
   identifying, by the network node, the AAA server to send an authentication request for the terminal device based on the name that is indicative of the at least one service included in the EAP response; and
   relaying, by the network node, an EAP authentication messages between the identified AAA server and the terminal device.

9. The system of claim 8, wherein the first information comprises a device identifier, a service capability server name, or an access point name (APN) that the terminal device can access.

10. The system of claim 8, wherein the terminal device is a wireless transmit/receive unit (WTRU).

11. The system of claim 8, wherein the EAP response further comprises at least one of a subscription identifier, wireless local area network identifier (WLAN ID), or access point name (APN).

12. A method comprising:
   storing information related to services that a device can access via a core network, the information comprises a name that is indicative of at least one service that is allowed to be accessed by the device;
   transmitting the name that is indicative of the at least one service;
   receiving an Extensible Authentication Protocol (EAP) request from the network;
   transmitting, to the network, an EAP response comprising a device identifier and the name that is indicative of the at least one service, wherein the name and the device identifier are different; and performing an EAP authentication with an Authentication, Authorization, and Accounting (AAA) server for accessing the at least one service.

13. The method of claim 12, wherein the name is indicative of an access point name (APN).

\* \* \* \* \*